March 17, 1959 | J. C. BERNEY | 2,877,612

REWINDING APPARATUS

Filed Sept. 24. 1956 | 12 Sheets-Sheet 1

JOSEPH C. BERNEY
INVENTOR.

BY Donald L. Rogers
AGENT

March 17, 1959 J. C. BERNEY 2,877,612

REWINDING APPARATUS

Filed Sept. 24, 1956 12 Sheets-Sheet 2

JOSEPH C. BERNEY
INVENTOR.

BY

AGENT

March 17, 1959 J. C. BERNEY 2,877,612

REWINDING APPARATUS

Filed Sept. 24. 1956 12 Sheets-Sheet 3

JOSEPH C. BERNEY
INVENTOR.

BY Donald L. Rogers

AGENT

JOSEPH C. BERNEY
INVENTOR.

BY Donald L. Royer
AGENT

March 17, 1959 J. C. BERNEY 2,877,612

REWINDING APPARATUS

Filed Sept. 24. 1956 12 Sheets-Sheet 5

JOSEPH C. BERNEY
INVENTOR.

BY Donald L. Rogers

AGENT

JOSEPH C. BERNEY
INVENTOR.

BY Donald L. Rogers

AGENT

March 17, 1959 J. C. BERNEY 2,877,612

REWINDING APPARATUS

Filed Sept. 24, 1956 12 Sheets-Sheet 7

JOSEPH C. BERNEY
INVENTOR.

BY Donald L. Rose

AGENT

March 17, 1959

J. C. BERNEY 2,877,612

REWINDING APPARATUS

Filed Sept. 24, 1956

12 Sheets-Sheet 8

JOSEPH C. BERNEY
INVENTOR.

BY Donald L. Rayer

AGENT

March 17, 1959 J. C. BERNEY 2,877,612

REWINDING APPARATUS

Filed Sept. 24, 1956 12 Sheets-Sheet 9

JOSEPH C. BERNEY
INVENTOR.

BY [signature]

AGENT

March 17, 1959 J. C. BERNEY 2,877,612

REWINDING APPARATUS

Filed Sept. 24, 1956 12 Sheets-Sheet 10

JOSEPH C. BERNEY
INVENTOR.

BY Donald L. Rogers
AGENT

March 17, 1959

J. C. BERNEY 2,877,612

REWINDING APPARATUS

Filed Sept. 24. 1956

12 Sheets-Sheet 11

JOSEPH C. BERNEY
INVENTOR.

BY David L. Rogers
AGENT

March 17, 1959 J. C. BERNEY 2,877,612

REWINDING APPARATUS

Filed Sept. 24, 1956

12 Sheets-Sheet 12

JOSEPH C. BERNEY
INVENTOR.

BY [signature]
AGENT

United States Patent Office 2,877,612
Patented Mar. 17, 1959

2,877,612

REWINDING APPARATUS

Joseph C. Berney, Long Beach, Calif.

Application September 24, 1956, Serial No. 611,556
18 Claims. (Cl. 53—118)

The present invention finds particular utility in the field of new and improved machinery and means for rewinding consumer size rolls of material such as for example, wax paper, crepe paper, tissue paper, wrapping paper, decorative paper, wallpaper, aluminum foils, films and such other flexible rolled products as those commercially known as cellophane and Saran, all of which fall in the category of thin flexible materials that lend themselves to a rewinding operation.

Heretofore, machinery has been known that has been utilized to rewind rolls of material such as paper and the like; however, due largely to design considerations, these prior machines have been extremely complex; have required the use of a large number of components; have been expensive in manufacture and maintenance; have occupied a greater amount of floor space than is desirable and in view of these prior difficulties, have been expensive in the original purchase thereof. In addition, high speed rewinding operation is extremely desirable but not available in like prior devices. Furthermore, any tendency for machines of this character to tear or otherwise injure rolls of material must be eliminated with such like prior devices having such a tendency.

In these prior consumer roll rewinding equipment, each roll core had to be individually placed on an arbor, either manually or automatically. Cores were manufactured and cut to length on core-making machines located away from the rewinding operation or had to be purchased and stored until required. In either case core-handling equipment and personnel were required as a subsidiary but hitherto unavoidable expense attached to the rewinding operation.

In view of the beforementioned difficulties in prior like apparatus, the present invention further relates to new and improved machinery for use in the manufacture of cores upon which rolls of material may be rewound, with the core manufacturing facility being incorporated as an integral operation in the present apparatus.

Furthermore, the invention finds further utility in such new and improved machinery for wrapping rewound rolls as a further integral operational characteristic of the present apparatus.

While the present machine will be shown and described as being related to a specific construction thereof, it is to be understood that additional duplicate winding stations may be employed and other conventional apparatus may be associated herewith to accomplish such conventional operations as the gluing together of the core material; insertion of printed material, pre-sheeted wrapper or other sheets into or around a wrapper of rewound rolls; or the utilization of a glue line along a wrapper for securing the wrapper about the rewound rolls. These adaptations are completed consistent with the principles involved herein in the delivery of a leading edge of material to the infeed means of guiding cages about suitable mandrels.

Additionally, it is to be understood that while the present invention is shown as applied to rolls of a particular width and ultimate diameter, no limitation is to be applied to the actual physical dimensions of the end product. In some of the more important instances in the present application, specific modified structure will be included, illustrated and described herein, in order that a clear teaching of the principles of the present invention may be set forth. In other instances, slight modifications of the structure and operational characteristics of the apparatus will be described in such a manner as to provide a clear teaching thereof for use by those persons skilled in the art in which the present apparatus resides.

It is accordingly one important object of the present invention to provide a simple and economical apparatus for the production of rewound rolls of paper or similar materials.

Another object of the invention is to provide a material rewinding apparatus having simple and expeditious means for making adjustments and/or changes in the length or width of rewound rolls of material in order that the same apparatus may be used economically to produce a variety of lengths and widths of rewound rolls.

A further object of the invention is to provide a material rewinding apparatus having integral means for manufacturing cores upon which rolls of material may be rewound.

Still another object of the invention is to provide a novel rewinding apparatus having integral means for applying an overwrapping or cover to rewound rolls of material.

A further object of the invention is to provide a machine for rewinding and/or wrapping rolls of paper material or the like, wherein a plurality of cages are rotatably carried on a common support structure and adapted for continuous rotation throughout operation of the machine.

Another important object of the invention is to provide an apparatus for rewinding rolls of paper material or the like wherein novel means are employed for the separate operation and driving of a plurality of cages employed therewith.

A further important object of the invention is to provide an apparatus for rewinding material or the like upon a suitable core and for thereafter applying an overwrapping to the rewound roll and wherein novel means are employed to deliver predetermined lengths of all of such materials to the rewinding portions of the apparatus.

Still another object of the invention is to provide a novel consumer roll wrapping machine wherein core manufacturing is accomplished as an integral part of machinery for performing the rewinding operation of material being handled.

Other and further important objects of the invention will become apparent from the disclosures in the following detailed specification, appended claims and accompanying drawings, wherein:

*General description*

In general, the present invention and its illustrated embodiment consists of a plurality of carrier cages and coaxial reciprocal chucks, circumferentially equally spaced apart and attached to functioning spider gears, a means for driving one or more of the winding cage rolls comprising part of each of the carrier cages and a means for continuously rotating the chucks and reciprocating the chucks as required. Means are provided for opening and closing each carrier cage at the appropriate rotary position of the spider gears. Provision is made for holding a parent roll of core material, feeding and cutting off said core material and feeding this material into the carrier cages at the appropriate time. Provision is also made for holding a parent roll of material to be rewound and for cutting it off after a predetermined amount of material has been fed into the apparatus. Furthermore, provision is made for holding a parent roll of wrapper material for feeding this material into the carrier cages as required, for wrapping the wrapper material about the material and for tucking ends of the wrapper into the rolls.

It is to be understood that the details of the present apparatus may be employed in connection with means to permit winding on premanufactured spiral wound cores to be loaded and automatically fed into the chucks, if this is desired, rather than to utilize cores manufactured by the present machine. Mechanisms of this type are well known and may be incorporated herewith. It is further contemplated that sheets of paper or other material to be inserted may be fed into the carrier cages from appropriate sheet feeding means rather than from parent rolls, as illustrated herein. Furthermore, additional stations and carrier cages may be employed, if desired, about the spider gears for accommodation of additional winding and/or inserting operations.

*The frame structure*

Figure 1:
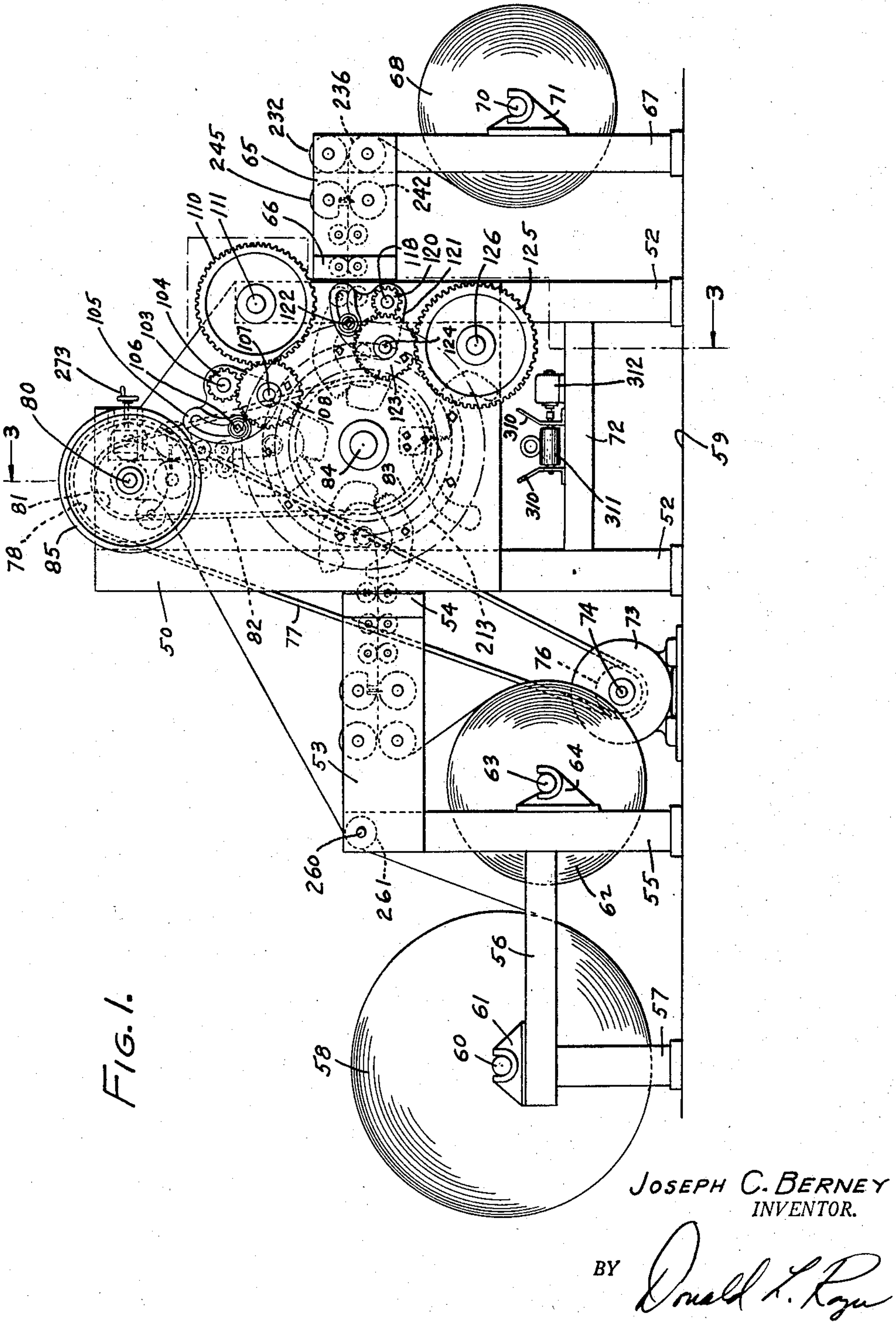
Figure 1 is a side elevational view of the present rewinding apparatus with a portion of the components thereof being shown in general illustrations for purposes of clarity pending detailed illustration in other figures hereof.
Figure 2:
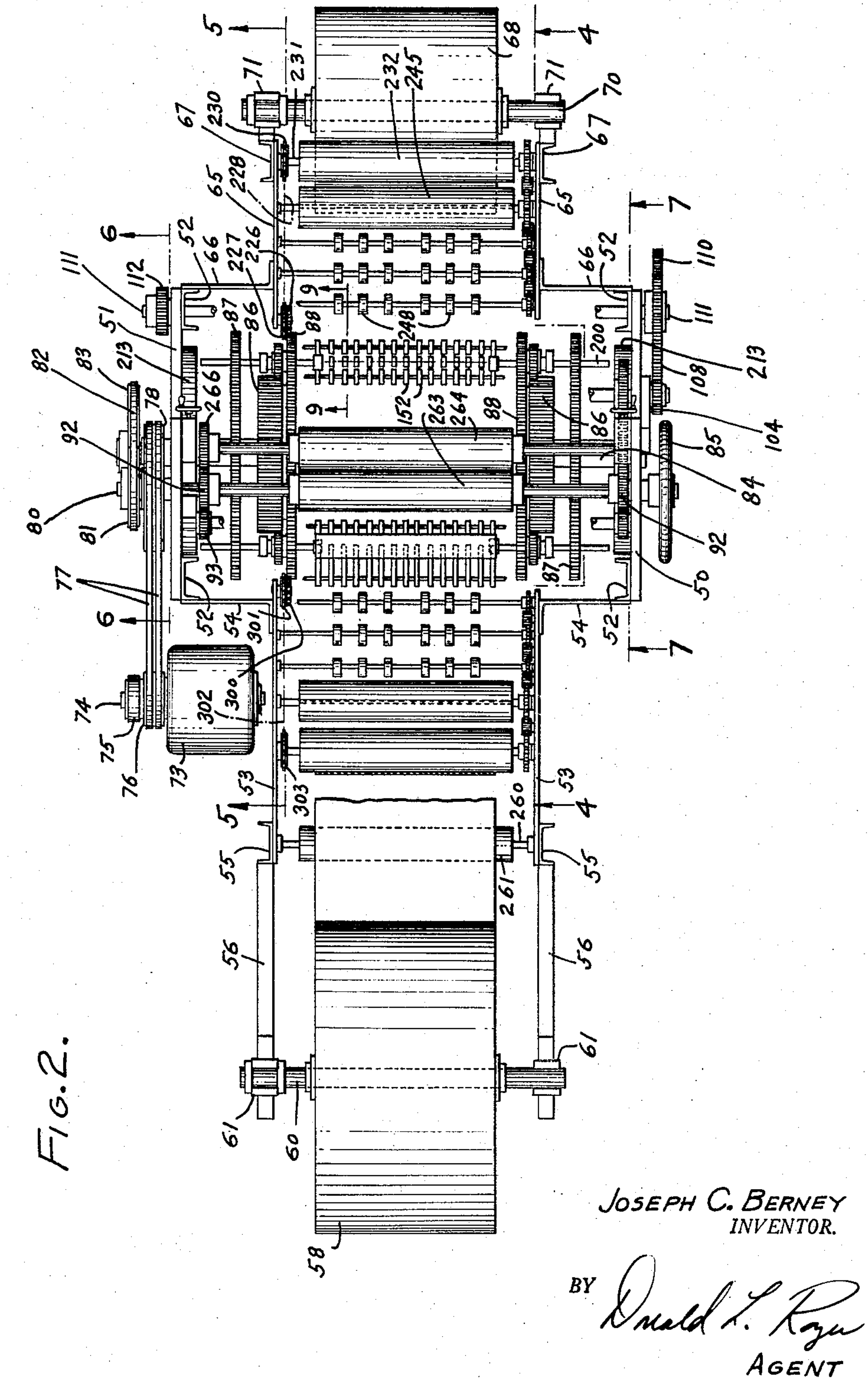
Fig. 2 is a top plan view of the present apparatus with portions of minute details having been omitted for purposes of clarity.

With reference to the drawings, the present machine comprises a pair of laterally spaced side plate members 50 and 51 that may be tied together by a suitable cross beam arrangement and serve to support the majority of the mechanisms of the present apparatus. The plate members 50 and 51 are carried by legs 52, these legs extending throughout the vertical length of the plate members 50 and 51. A pair of side plate members 53 are connected to the leftward side of the machine as shown in Fig. 1 and to a pair of the legs 52 by means of angle brackets 54. The outer free ends of the plate members 53 are suported on suitable legs 55. As shown in Figs. 1 and 2, a pair of beams 56 are connected to the legs 55 and extend outwardly therefrom, the outer ends being supported on legs 57. The outer ends of the beams 56 serve to support a parent roll 58 of material to be rewound, that is carried by a shaft 60 that is in turn journalled in bearings 61 positioned on the beams 56. The legs 55 serve to support a parent roll 62 of wrapper material, as carried by a shaft 63 that is in turn journalled in suitable bearings 64 attached to lateral sides of the legs 55. In accordance with usual practice, suitable breaking means and lateral positioning means may be associated with each of the material parent rolls and support mechanism therefor.

A further pair of plate members 65 extend from the rightward portion of the machine, as viewed in Fig. 1. The plate members 65 are connected to a pair of the legs 52 by means of brackets 66, the outer free ends of the plate members 65 being supported on suitable legs 67. The legs 67 serve to support a parent roll of core material that is mounted on a shaft 70 which is in turn journalled in bearings 71 attached to lateral sides of the legs 67. The legs 52, 55, 57 and 67 are all adapted to rest upon a common planar floor surface 59, with the legs 52 being braced as by cross members 72. A main electric driving motor 73 is also positioned on the common planar surface 59.

*The driving mechanism*

As shown in Figs. 1, 2, 4 and 6, the driving motor 73 has an output shaft 74 on which is mounted an electrically operable magnetic clutch 75. A double pulley 76 is mounted on the shaft 74 intermediate the motor 74 and the clutch 75 and is driven through the clutch 75, there being a pair of driving belts 77 disposed about the pulley 76 and extended to a double pulley 78 carried by a main driving shaft 80. The shaft 80 is disposed laterally across the apparatus and is rotatably journalled in the upper portions of the side plate members 50 and 51. An adjustable speed pulley 81 is also carried by an outer end of the shaft 80, there being a belt 82 extending about the pulley 81 and to a further pulley 83 carried by an outer end of a cage support structure shaft 84, the shaft 84 also being journalled in the side plate members 50 and 51. The pulley combination 81 and 83 is variable in speed relationship in order to the speed and slippage of arbor chucks. The end of the shaft 80 opposite from the pulleys 78 and 81 has affixed thereto a hand wheel 85 which acts both as a means to permit manual rotational movement of the present aparatus and as a flywheel.

The large transverse shaft 84 has affixed thereto a pair of laterally spaced arbor chuck drive gears 86 that are keyed to the shaft 84. The shaft 84 further serves rotatably to support laterally outer spider gears 87 and laterally inner spider gears 88, the gears 87 and 88 being spaced laterally on each of the sides of the arbor chuck driving gears 86. The spider gears 87 and 88 form a portion of the carrier cage support structure with the various mechanisms associated with the carrier cages being operatively connected to the spider gears. The gears 87 and 88 are each connected laterally together by means of a plurality of tie blocks 90, Figs. 12 and 17, that are secured to the gears as by screws 91. Thus, each pair of the spaced spider gears 87 and 88 are adapted to be rotated together due to the lateral interconnection thereof by the tie blocks 90. The tie blocks 90 are spaced radially outwardly from the outer periphery of the chuck driving gear 86.

A suitable gear train mechanism is employed with the present apparatus in order to apply the appropriate and desired speeds to each of the various driving shafts and gears thereof. This gear train mechanism is shown primarily in Figs. 1, 2, 3, 6 and 7 and is driven initially from the main shaft 80. The various spur gears in the gear train utilized herein are, for economy and simplicity, in most instances, either connected to or rotatably journalled on other existing shafts in the apparatus. Obviously, the various spur gears may, in some instances, be of the helical types. Spur gear 92 is carried by an inner end of the shaft 80 adjacent the side plate member 50. The gear 92 serves to drive idler gear 93 carried by a shaft 94 that is journalled in the side members 50 and 51. The gear 93 is adapted to drive spur gear 95 fixed to a shaft 96 that is also journalled in the side plates 50 and 51. The gear 95, in turn, is adapted to drive spur gear 97 that is connected to a shaft 98 journalled in the side plates 50 and 51. The side plate 50 is adapted to support an idler gear 100 that is freely rotatably mounted on a stub shaft 101. The idler gear 100 is adapted to mesh with a spur gear 102 that is secured to and adapted to rotate a shaft 103 which extends transversely of the apparatus and is journalled in the side plates 50 and 51.

The outer end of the shaft 103, adjacent the side plate 50, serves to support a spur gear 104, there being a swing plate 105 disposed between the gear 104 and the side plate 50. The swing plate 105 is rotatably journalled on the shaft 103 and is adapted to be secured in the desired pivotal position by means of a lock bolt 106. The swing plate 105 has a stub shaft 107 disposed therefrom on which a gear 108 is rotatably mounted. The gear 108 is adapted to mesh with a change gear 110 that is secured to an outer end of a shaft 111 adjacent the side plate 50. Changing the gear 110 serves to provide means for securing various lengths of rolls by changing the number of revolutions made by the spider gears relative to revolutions of feed rolls. The shaft 111 is journalled in the side plates 50 and 51 and has an end thereof, adjacent the side plate 51, that carries a spur gear 112. The gear 112 cooperated with a dual speed reduction gear 113 that is journalled on a stub shaft 114 carried by the side plate 51. The speed reduction gear further cooperates with an idler gear 115, rotatably mounted on a stub shaft 116 that is carried by the side plate 51. The idler gear 115 is adapted to mate with a further spur gear 117 that is keyed to a transverse shaft 118, the shaft 118 being journalled in the side plates 50 and 51. The gears 115 and 117 serve to provide one of several possible speed changing facilities. The end of the shaft 118 adjacent the side plate 50 carries a spur gear 120, there being a swing plate 121 disposed between the gear 120 and the outer surface of the side plate 150. The swing plate 120 is journalled for pivotal movement on the shaft 118 and is retained in the desired pivotal position by means of a lock bolt 122. The swing plate 121 serves rotatably to support a gear 123 that is carried by a stub shaft 124 connected to the swing plate. The gear 123 is adapted to drive a further change gear 125 that is connected to an outer end of a transverse shaft 126. The shaft 126 is journalled in the side plates 50 and 51 and has affixed thereto a pair of spur gears 127 that are adapted to mate with and drive the main spider gears 87 and a pair of further spur gears 128 that are adapted to mate with and drive the spider gears 88. The gears 87 and 88 are driven in a direction opposite from the chuck drive gears 86.

Figure 3:
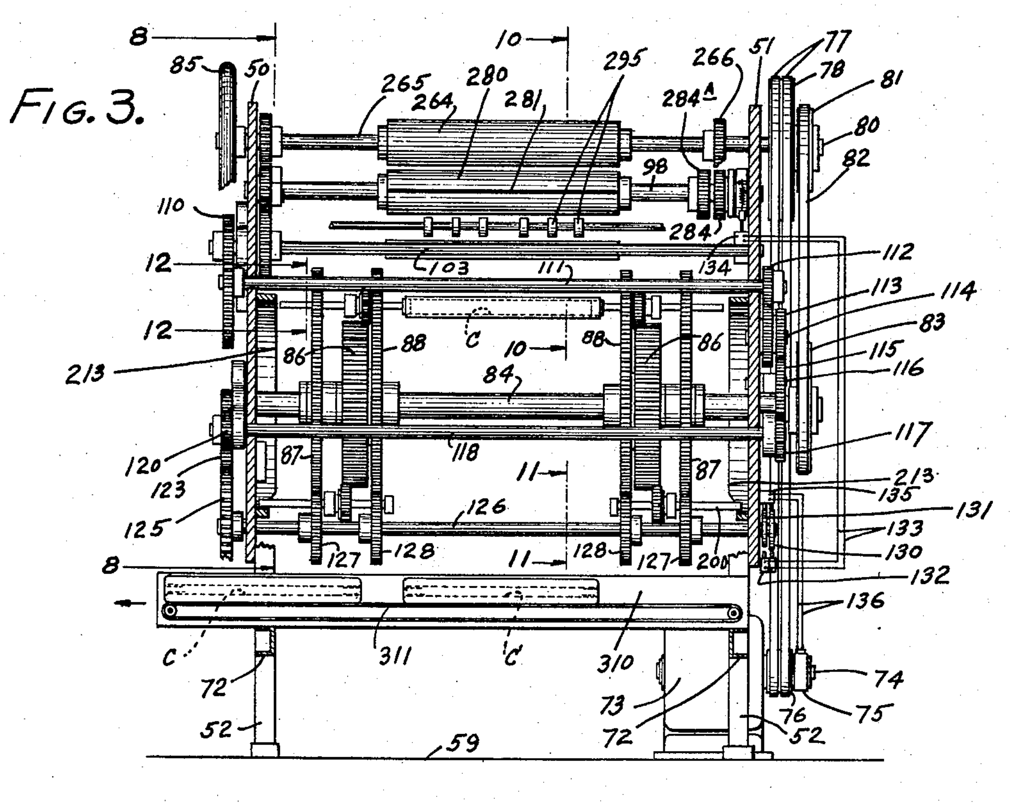
Fig. 3 is a transverse sectional view through a central portion of the apparatus as taken substantially as indicated by line 3—3, Fig. 1.
Figures 6, 7:
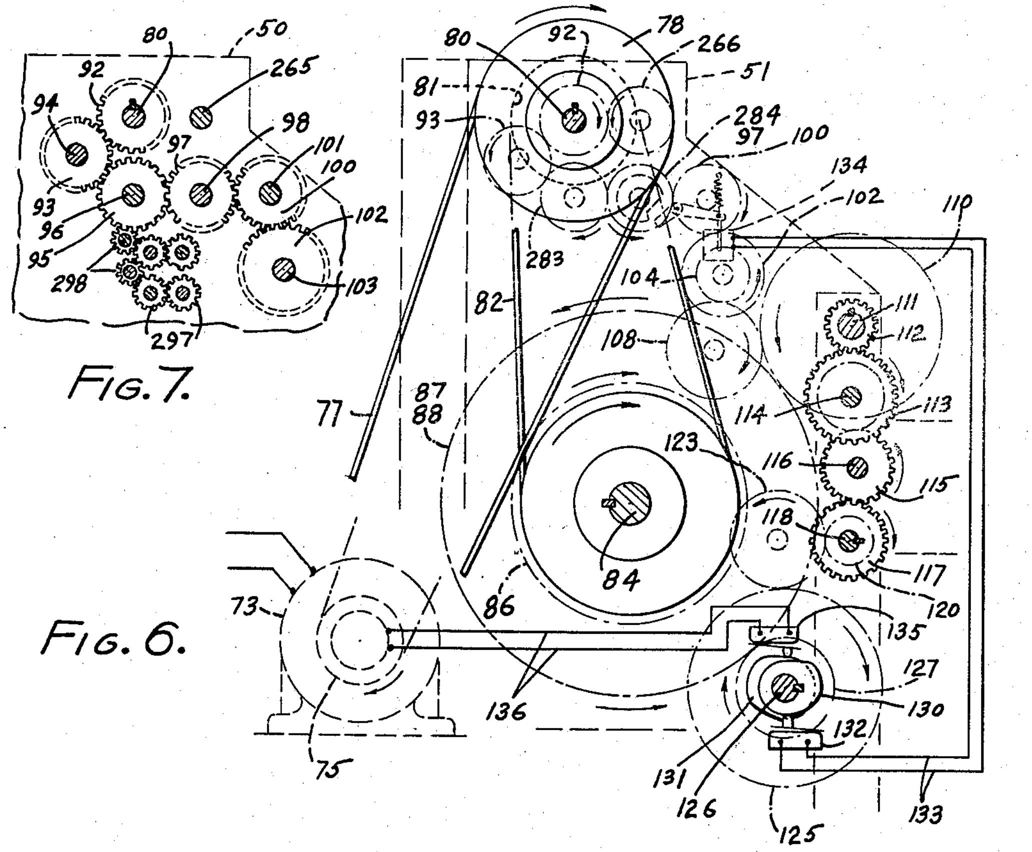
Fig. 6 is a generally diagrammatic view similar to Figs. 4 and 5, illustrating the general driving arrangement and gear interconnections of portions of the present apparatus, this figure being based upon portions of the apparatus taken substantially as indicated by line 6—6, Fig. 2.
Fig. 7 is a fragmentary sectional view showing other portions of the rewinding apparatus as taken substantially as indicated by lines 7—7, Fig. 2.

As shown primarily in Figs. 3 and 6, the outer end of the transverse shaft 126, adjacent the side plate 51, has a pair of cams 130 and 131 connected thereto. The outermost cam 130 is adapted for cooperation with a normally open switch 132 that is connected, by way of a pair of leads 133, to a solenoid 134 mounted on an inner lateral surface of the side plate 51. The purpose of the solenoid 134 will be hereinafter more fully described. The cam 131 is adapted for cooperation with a normally closed switch 135 that is connected, by way of a pair of leads 136, to an electromagnetic clutch 75 that is mounted on the shaft 74 of the driving motor 73. The purpose of the switch 135, associated leads 136 and electromagnetic clutch 75 will be hereinafter more fully described.

*The carrier cage mechanism*

Figure 13:
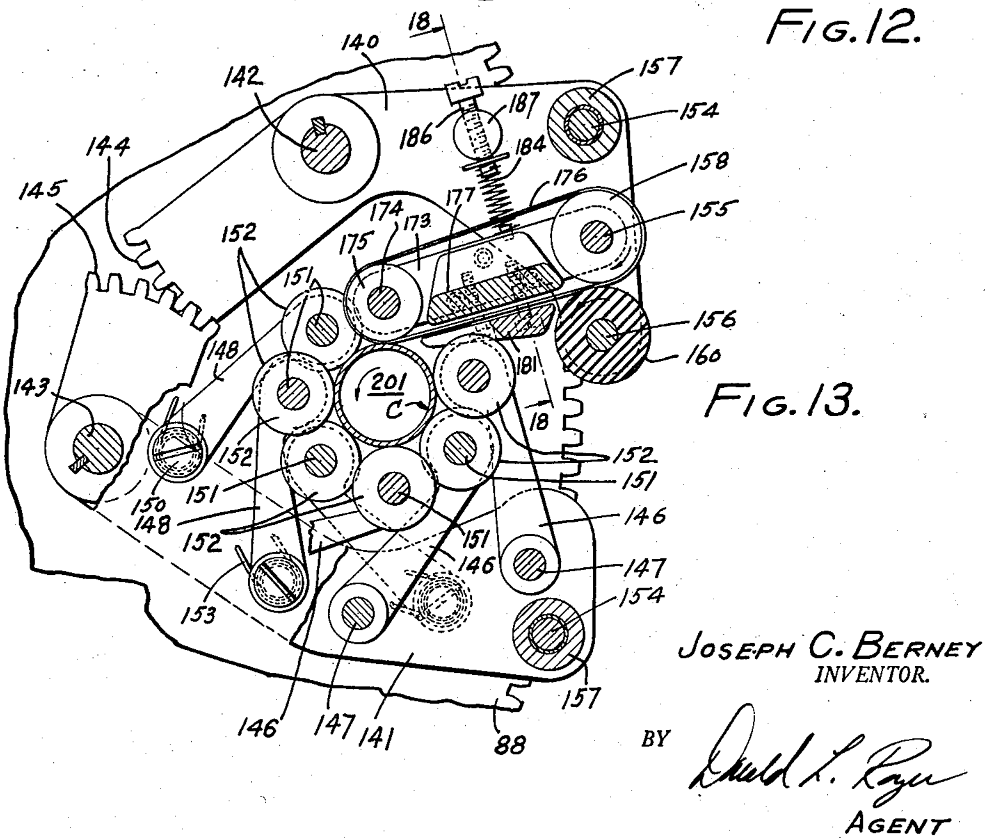
Fig. 13 is an enlarged fragmentary sectional view, similar to Fig. 9, showing minute details of the core making station, together with details of the cage mechanism, the cage mechanism illustrated in this figure being typical of all of the cage mechanisms.

With reference now primarily to Fig. 13, wherein a typical carrier cage mechanism is illustrated, the typical cage mechanism includes carrier cage side plate members 140 and 141. The plate member 140 is keyed to a shaft 142 that is rotatably supported at each end thereof in spider gears 87. The side plate members 141 are keyed to a shaft 143 that also is rotatably journalled in spider gears 88. The plate members 140 and 141 are generally L-shaped and have mating gears sectors 144 and 145, respectively, for a purpose to be hereinafter more fully described. The plate members 141 have laterally disposed therefrom a plurality of arms 146 that are pivoted on studs 147 connected to the plate members 141. Additionally, a second plurality of arms 148 are connected to the lateral face of the spider gear 88 and pivotally supported on studs 150. Each of the free ends of the arms 146 and 148 are adapted rotatably to support cage shafts 151 on which are mounted a plurality of rollers 152 that are arranged in alternately spaced relationships and longitudinally disposed with respect to adjacent shafts 151. The arms 146 and 148 are each provided with torsion springs 153 about the pivot studs thereof, whereby to bias the rollers 152 radially inwardly toward each other in order to provide the carrier cages in which the material will be unwound. Each of the cage side members 140 and 141 are interconnected on opposite sides of the apparatus by means of shafts 142 and 143, the members 140 being additionally interconnected by means of shafts 155 and 156. The shafts 154 serve to support freely rotatable rollers 157 intermediate laterally disposed side cage plates 140 and 141, while the shaft 155 supports a plurality of spaced pulleys 158. The shaft 156 serves to support a resilient pressure roller 160 that is disposed between lateral cage side plates 140. This roller 160 may comprise several spaced rollers, if desired.

Figure 12:
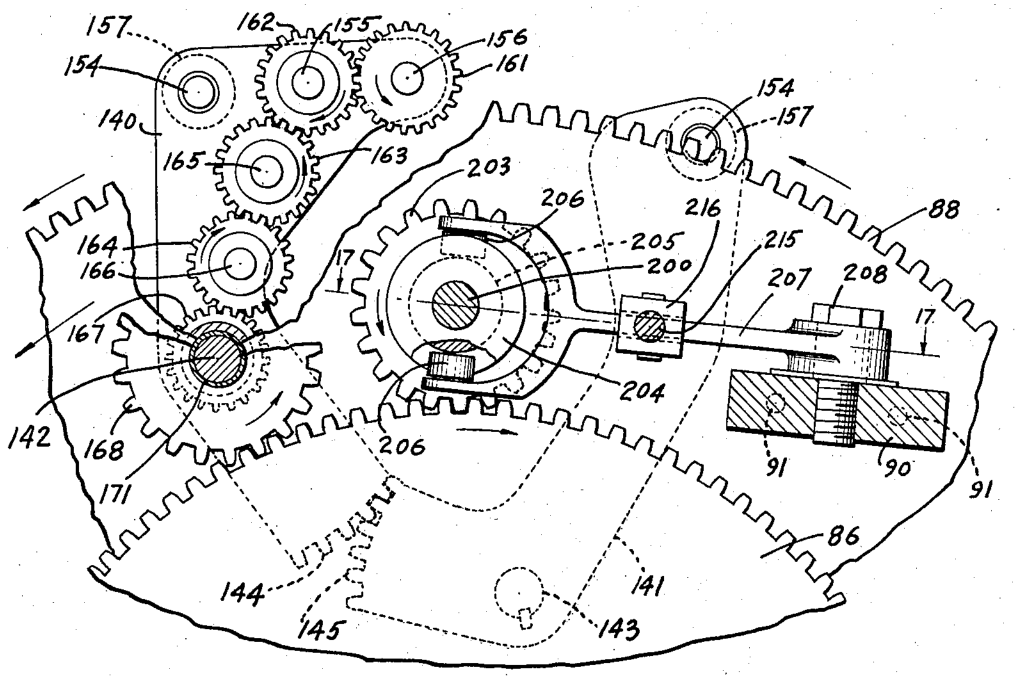
Fig. 12 is a greatly enlarged fragmentary sectional view showing details of the cage driving and arbor chuck operating mechanisms, as taken substantially as indicated by line 12—12, Fig. 3.
Figures 14, 15, 16, 17:
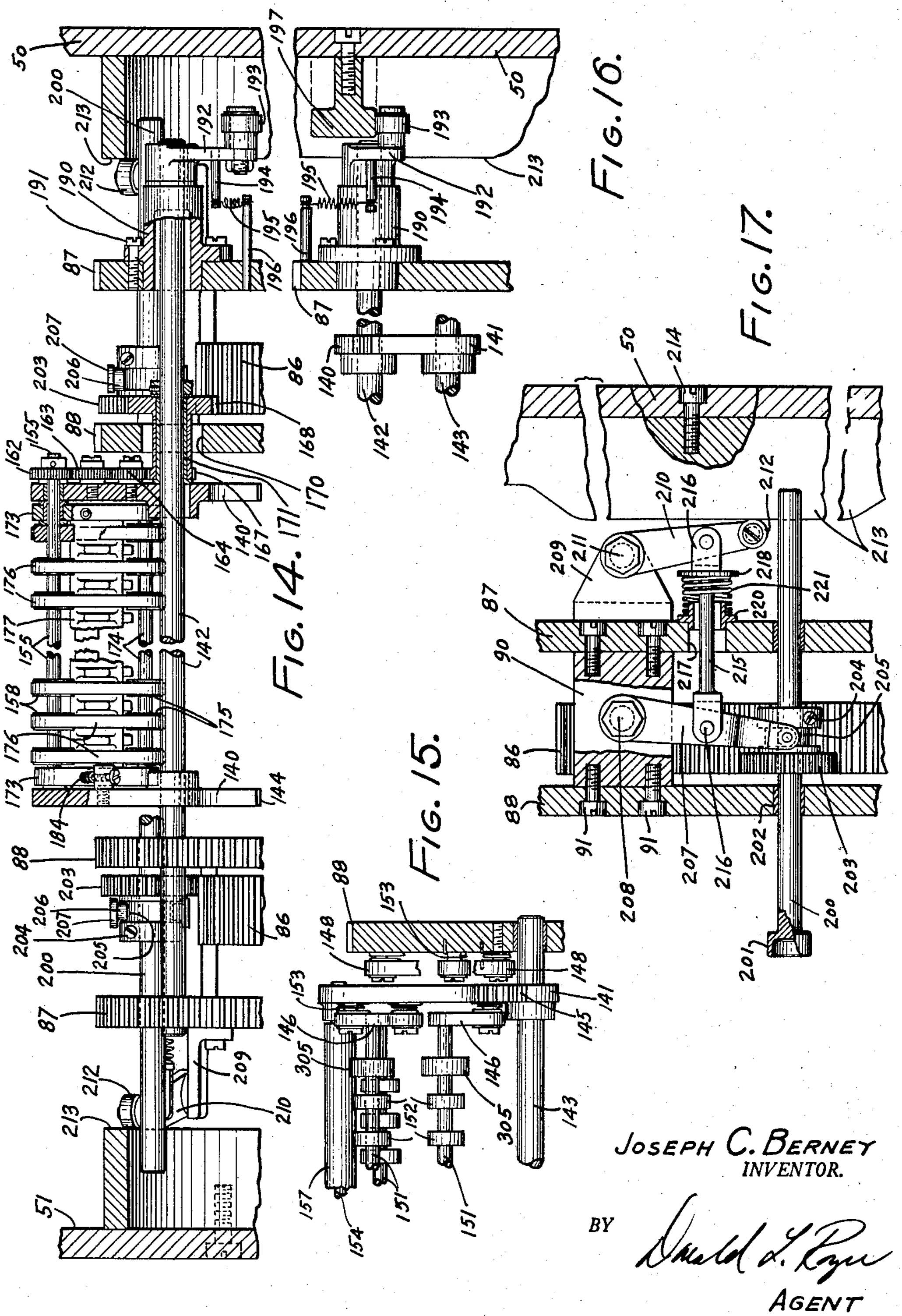
Fig. 14 is a fragmentary transverse sectional view through the cage support and adjacent cage, as taken substantially as indicated by line 14—14, Fig. 4.
Fig. 15 is a fragmentary sectional view illustrating a typical end construction arrangement for the cages.
Fig. 16 is a fragmentary sectional view similar to a portion of Fig. 14 and illustrating details of the mechanism utilized for opening the cages when in the unloading station.
Fig. 17 is a fragmentary sectional view illustrating means by which the chuck arbors are supported, driven and moved laterally during operation of the apparatus, as taken substantially as indicated by line 17—17, Fig. 12.

As shown in Figs. 12 and 14, an outer end of the shaft 156 is adapted to support a spur gear 161 that mates with a spur gear 162 affixed to the outer end of the shaft 155. A pair of idler gears 163 and 164 carried respectively on studs 165 and 166 disposed from one of the cage side plates 140, mate with the spur gear 162 and with feed driving gear 167 that is formed integrally with a larger driving gear 168. The hub of the gears 167 and 168 extend through an opening 170 in one of the spider gears 88 (Fig. 14), with the gears 167 and 168 being rotatably journalled on a bearing 171 surrounding the transverse shaft 142. The gear 168 is adapted to mesh with the chuck driving gear 86 and be rotated continuously thereby, whereby to rotate the gears 164, 163, 162 and 161 and the shafts 155 and 156.

As shown primarily in Figs. 13, 14, 18, 19 and 20, lateral ends of the shafts 155 have rotatably mounted thereon elongated pivot arms 173, the free ends of which are interconnected by means of a shaft 174. The shaft 174 has a plurality of pulleys 175 mounted thereon, there being endless belts 176 disposed about the pulleys 175 and the previously described pulleys 158 on the shaft 155.

Figures 18, 19, 20:
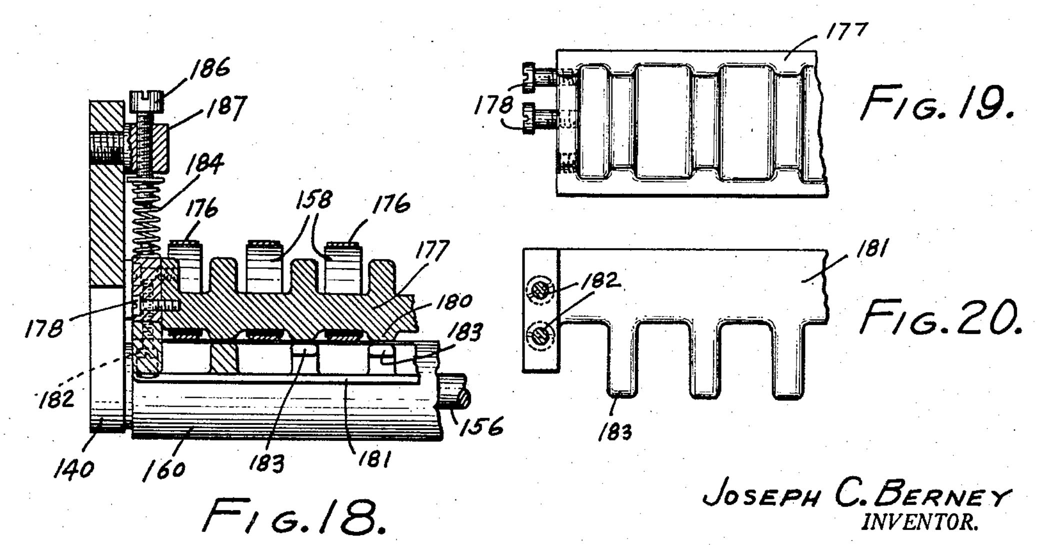
Fig. 18 is a fragmentary sectional view showing details of a guide mechanism associated with the cages as taken substantially as indicated by line 18—18, Fig. 13.
Fig. 19 is a fragmentary detail view illustrating the construction of one of the guide members employed with the cages and is illustrated in section in Fig. 18.
Fig. 20 is a detailed view showing the construction of the other of the guide members.

As shown in Figs. 13 and 18, a guide member 177 is disposed laterally between the lateral arms 173 and secured thereto by means of screws 178. The guide member 177 has guide fingers 180 disposed downwardly therefrom and intermediate the spaced pulleys 158. Additionally, the guide member 177 has connected to a lower surface thereof a second guide member 181 that is secured to the first guide member 177 by means of screws 182 at the lateral outer ends thereof. The guide member 181 has a plurality of fingers 183 which are disposed adjacent the fingers 180 on the guide member 177.

It is to be noted that the belts 176 and the support driving mechanisms therefor, together with the guide members 177 and 181, are all pivotally disposed for movement about the shaft 155. The arms 176 are biased in a direction whereby to dispose the pulleys 175 inwardly toward the cage formed by the rollers 152 by means of compression springs 184 that are disposed between pins on the upper surfaces of the arms 173 and adjusting screws 186 carried by threaded blocks 187 that are in turn attached to the cage side plate members 140. It may thus be seen that the belts 176 will be continuously driven whereby to rotate any material that is disposed within the carrier cage, rollers 152 being driven by contact with the material on the arbor chuck. The belts cooperate with the rolls 160 to lead the leading edge of the material web toward the arbor chuck. Additionally, the belt 176 are biased into contact with the core C or other material thereabout by action of the compression springs 184. The surface speed of the arbor chuck is slightly greater than the surface speed of the belts 176 as determined by the tension requirements in the binding product material.

Figure 8:
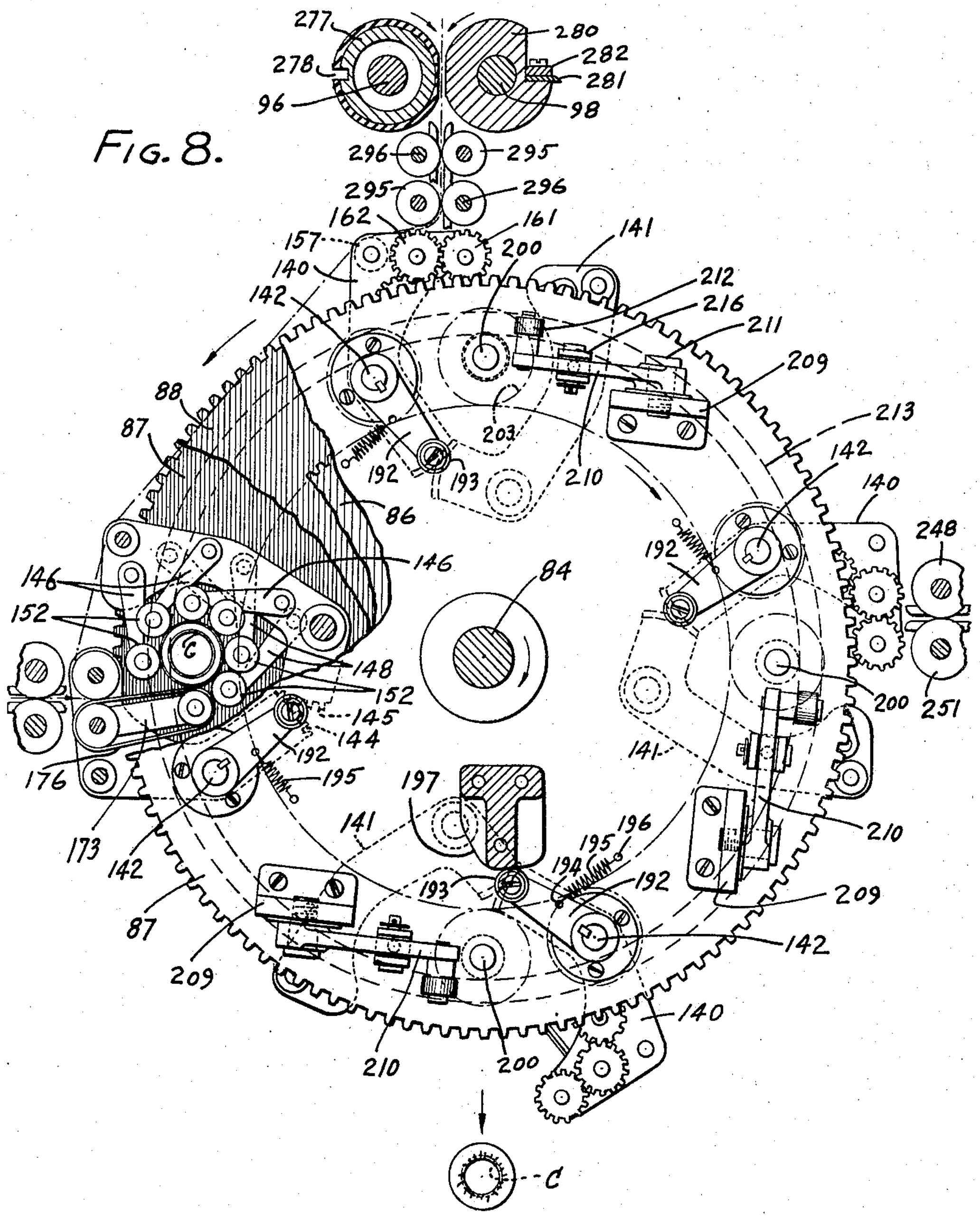
Fig. 8 is an enlarged fragmentary sectional view, partially broken away, illustrating the rotatable support structure for the plurality of cages employed herewith, details of the wrapping station and cage employed therewith being shown, as taken substantially as indicated by lines 8—8, Fig. 3.

With reference to Figs. 8, 14, and 16, it may be seen that each of the shafts 142 of each of the carrier cages have one end journalled in the spider gears 87 and 88 on one side of the machine and are journalled in bearings 190 that are secured to the spider gear 87 on the other side of the machine as by screws 191. The shafts 142 each have a crank member 192 secured to the outer end thereof, the outer end of the crank member 192 having a roller 193 mounted thereon. The crank member 192 further has a pin 194 disposed laterally therefrom to which a tension spring 195 is connected. The other end of the tension spring 195 is secured to a pin 196 that is disposed outwardly from and connected to the spider gear 87. It may be seen that the action of the tension springs 195 are such as to bias the levers 192 in directions to rotate the shafts 142 and to maintain the cages in closed positions as shown in Fig. 13.

Figures 9, 10, 11:
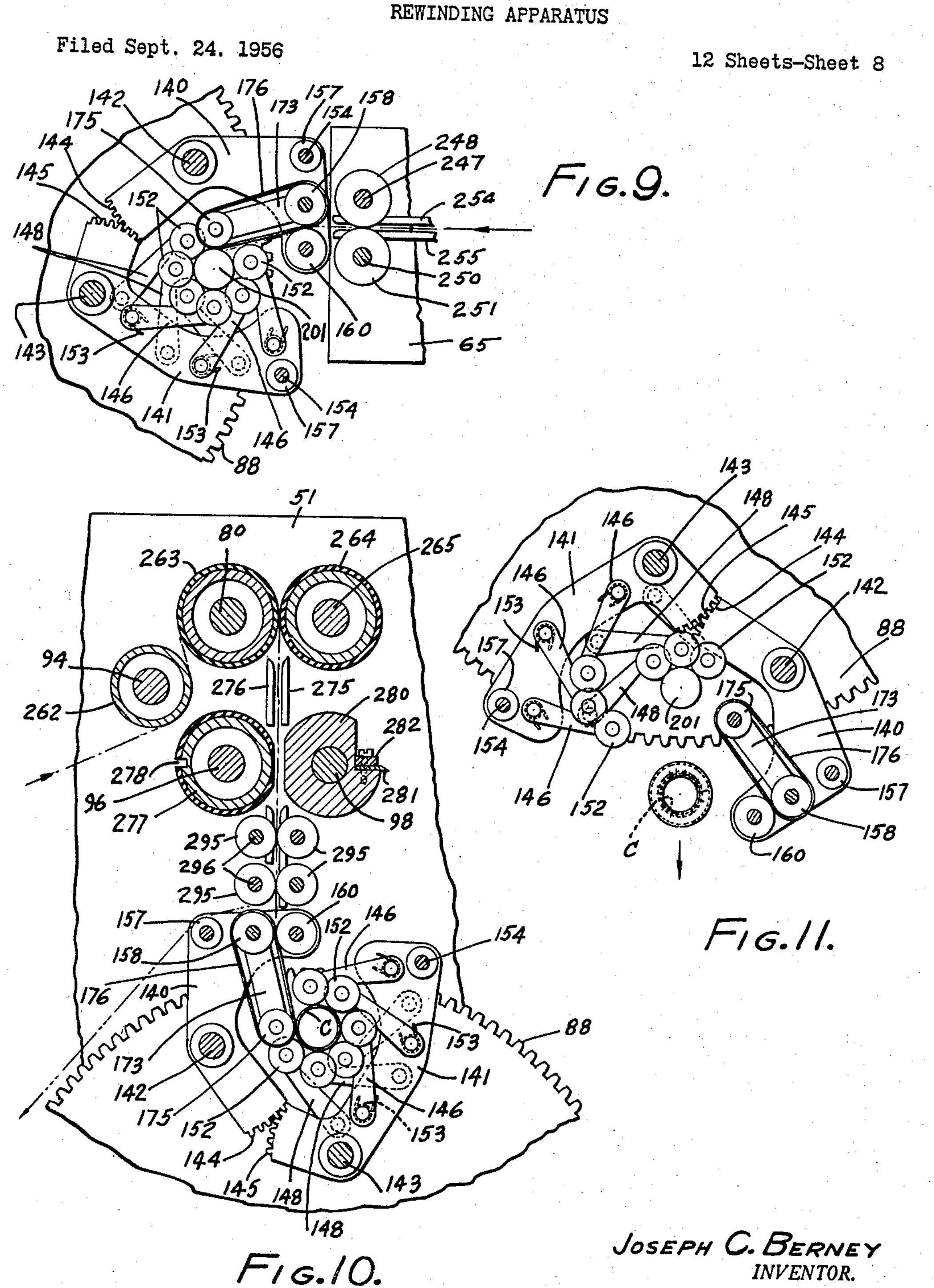
Fig. 9 is a fragmentary sectional view showing the core winding station, as taken substantially as indicated by line 9—9, Fig. 2.
Fig. 10 is an enlarged fragmentary sectional view showing details of the rewinding material inserting station, as taken substantially as indicated by line 10—10, Fig. 3.
Fig. 11 is a fragmentary sectional view showing the unloading station for the present apparatus, with the cage employed at this station being shown in an open position, the view being substantially as indicated by line 11—11, Fig. 3.

As shown in Figs. 8, 11 and 16, the rollers 193 are adapted to contact a cam member 197 that is secured to the side plate member 50 and disposed laterally inwardly therefrom. Upon contacting the cam surfaces of the cam member 197, the roller 193 will ride along these cam surfaces to rotate the crank 192 and the shaft 142 whereby to open the cage through rotation of the shaft 142 and through interaction of the gear sectors 144 and 145, to rotate the cage plate member 141 with the shaft 143 simultaneously with rotation of the plate member 140 with the shaft 142.

*The arbor and cage opening mechanism*

Each of the carrier cages has associated therewith a pair of coaxially disposed chuck arbors 200 having a follow enlarged head portions 201. Each arbor 200 is rotatably and slidably journalled in bearings 202 in the spider gears 87 and 88 (Fig. 17). The arbors 200 also have secured thereto an arbor rotating gear 203 that is clamped in lateral position to the arbor 200 as by a clamp and nut arrangement 204. The arrangement 204 is such as to permit positioning thereof for different length rolls by sliding arbor shaft 200 through the clamp and gear. The clamp nut arrangement has an annular groove 205 therein in which laterally disposed rollers 206 of lever arms 207 are disposed. The lever arms 207 are forked in order that roller 206 will occur at opposite sides of the yoke annular groove 205. This arrangement permits even pressure and prevents binding of the shaft 200 in response to movement of lever arm 207. The lever arm 207 is pivotally secured as at 208 to the tie blocks 90 disposed between the spider gears 87 and 88. The spider gears 87 have brackets 209 mounted on the outer lateral surfaces thereof that are adapted pivotally to support levers 210 as by a pivot member 211. The free ends of the levers 210 rotatably carry rollers 212 that are adapted for cooperation with annular cams 213. The cams 213 are secured to the side plant members 50 and 51 as by suitable screws 214. A link 215 having end fittings 216 is disposed between each of the levers 210 and 207 and disposed through an opening 217 in the spider gears 87. A washer 218 is disposed against one of the fittings 216 and a spring retainer 220 is disposed in an outer end of the opening 217, there being a compression spring 221 disposed between the washer 218 and the spring retainer 200. The action of the compression springs 221 is such as to bias the rollers 212 into contact with the cam surfaces of the annular cams 213. Obviously, the cam 213 may positively guide the rollers 212 to eliminate the necessity for springs 221 and supports therefor.

*Core material feeding and cutoff station*

Figures 5, 21, 22, 23:
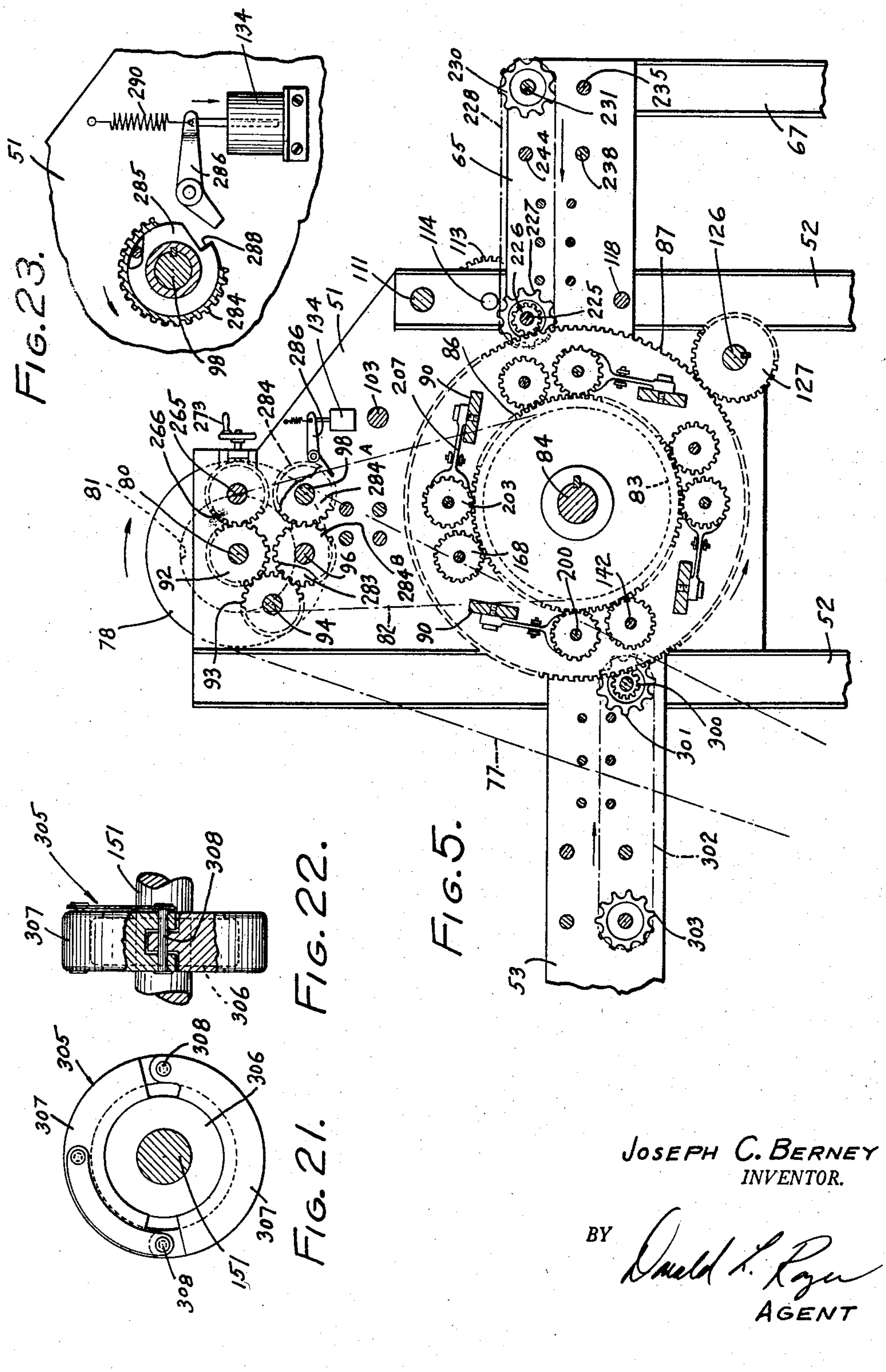
Fig. 5 is a sectional view similar to Fig. 4 taken on another side of the present apparatus and substantially as indicated by line 5—5, Fig. 2.
Fig. 21 is a detail elevational view illustrating one form of wrapper end tucking arrangement that may be employed therewith.
Fig. 22 is a side elevational view of the tucking device shown in Fig. 21, partially broken away for clarity.
Fig. 23 is an enlarged fragmentary sectional view showthe one-way driving clutch and operating mechanism therefor, as associated with the material rewinding station hereof.

With reference primarily to Figs. 1, 4, 5, 8 and 9, means are provided for delivering a web from the parent core material roll 68 to the proper station for insertion into one of the roller cages. As shown in Fig. 5, a stub shaft 225 is carried by one of the plate members 65 and serves rotatably to support a spur gear 226 and a sprocket 227. The spur gear 226 is adapted to be driven by coaction with one of the spider gears 87, the sprocket 227 being connected by means of a chain 228 with a second sprocket 230. The sprocket 230 is keyed to a transverse shaft 231 that has a pressure roller 232 mounted thereon. The end of the shaft 231 remote from the sprocket 230 and laterally adjacent one of the plate members 65 carries a spur gear 233 that is adapted for cooperation with a spur gear 234 carries by another transverse shaft 235. The shaft 235 carried a roller 236 that cooperates with the pressure roller 232. The spur gear 234 is adapted to drive a spur gear 237 mounted on a transverse shaft 238 through a suitable idler gear 240 that is rotatably mounted on a stub shaft 241, thereby to drive the spur gear 237 in the same direction as the spur gear 234. The shaft 238 serves to support a transverse cutter anvil roller 242 having an elongated slot 243 mounted on a shaft 244 which carries a knife blade roller 245 having a blade 246. The shafts 231, 235, 238 and 244 are all journalled in the side plates 65.

In order to guide the core material from the knife blade roller 245, a plurality of gear driven upper transverse shafts 247 are journalled in the side plates 65 and carry spaced rollers 248. A plurality of lower shafts 250 are also journalled in the side plates 65 and carry a plurality of rollers 251. The shafts 250 are each provided at outer ends thereof with spur gears 252 which cooperate with idler gears 253 to drive the rollers 251 and 28. One of the idler gears 253 is adapted for cooperation with the spur gear 237. Additionally, with reference to Fig. 9, sets of guide plates 254 and 255 serve to guide the core material in passage between the rollers 248 and 251.

*Rewinding material feeding and cutoff station*

With reference now primarily to Figs. 1, 8 and 10, means are provided for guiding a web from the parent roll 58 of the material to be rewound to the proper position for placement into one of the carrier cages and disposition about the core C. As shown in Fig. 1, the outer ends of the plate members 53 serve to support a shaft 260 on which a roller 261 is mounted. The web of material from the parent roll 58 is adapted to pass over the roller 261 and under a roller 262 that is rotatably mounted on the gear train shaft 94. Thereafter, the web of material to be rewound passes about a measuring roller 263 that is carried by the main driving shaft 80. A pressure roller 264 is secured to a shaft 265 and cooperates with the roller 263. The outer end of the shaft 265 is fitted with a spur gear 266 (Fig. 5) that mates with the spur gear 92 of the shaft 80, whereby to drive the shaft 265.

Figures 4, 24:
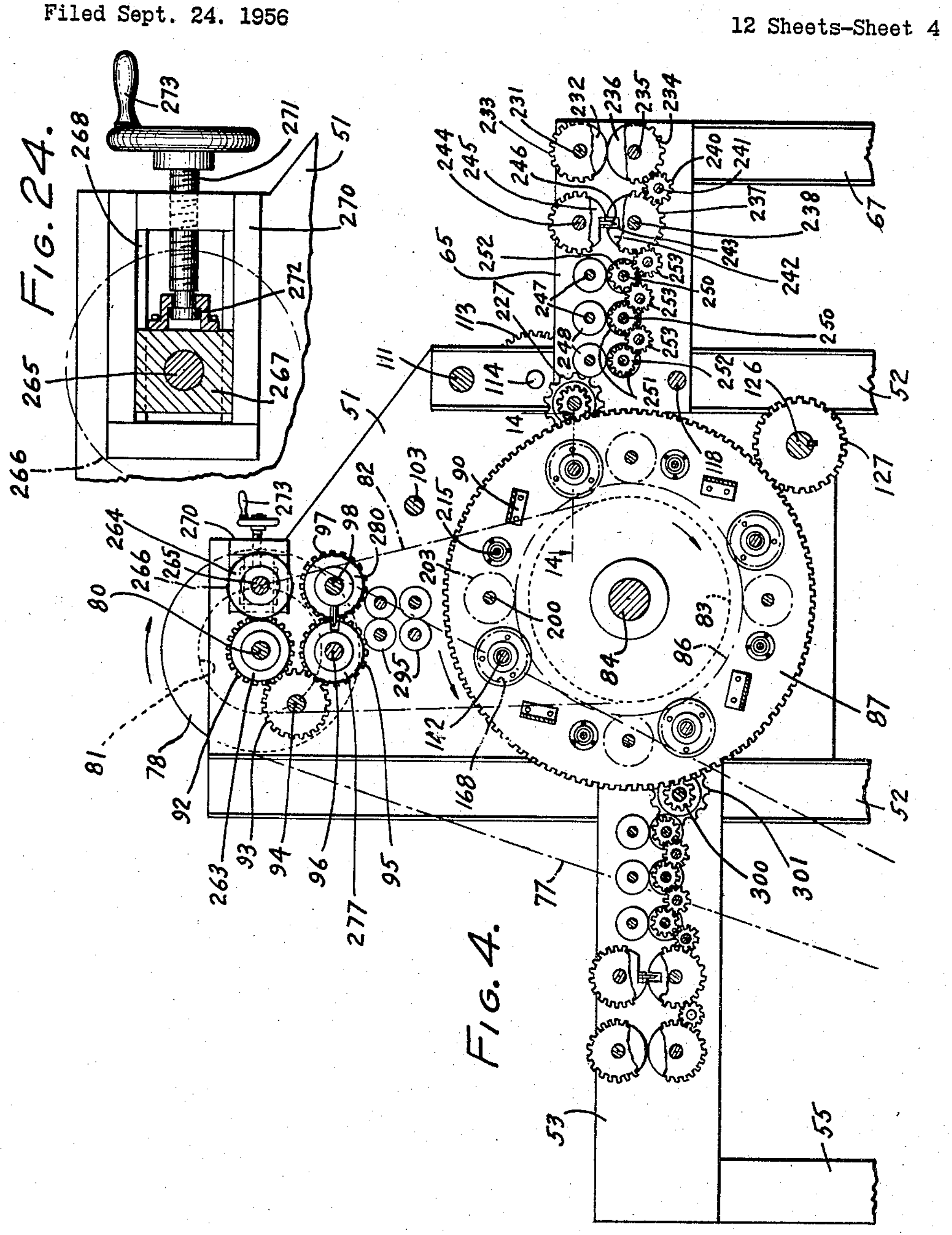
Fig. 4 is an enlarged sectional view showing a portion of the material feeding station mechanisms and gear train arrangements as taken substantially as indicated by line 4—4, Fig. 2.
Fig. 24 is an enlarged fragmentary sectional view illustrating mechanism by which the material to be rewound is maintained under tension and pulled from a parent roll for passage into the material rewinding station.

It is to be noted, with reference to Figs. 4 and 24, that the pressure of the roller 264 against the roller 263 is adjustable, the outer ends of the shaft 266 being journalled in blocks 267 that are disposed in ways 268 in a guide arrangement 270. A threaded spindle 271 threadably engages the guide arrangement 270 and has an inner end fitting 272 which engages the block 267. The outer end of the spindle 271 is fitted with a hand crank handle 273.

With reference again to Fig. 10, the web of the material to be rewound passes from the feed rollers 263 and 264 and between a pair of guide plates 275 and 276 that are connected to the side plate members 50 and 51. A cutoff mechanism is provided by means of a notched resilient surface roller 277 that is secured to the shaft 96. The roller 277 has a longitudinal notch 278 therein. The knife blade roller 280 is secured to the shaft 98 and carries a knife blade 281 that is secured in position by means of a screw plate 282.

Continuously driven spur gear 283 is freely rotatable on shaft 96 and drives gear 284 which is mounted on single revolution clutch 285. Lever 286 is biased by tension spring 290 normally to engage with notch 288 of the single revolution clutch 285, thus allowing gear 284 to rotate but preventing power from being transmitted to shaft 98. Upon energization of solenoid 134, the lever 286 is pulled out of engagement with notch 288 of single revolution clutch 285 and shaft 98 becomes driven by gear 284. Means are provided for permitting clutch 285 to make only one revolution and then remain in the stop position. Gear 284A is secured to shaft 98 and drives shaft 96 through gear 284B secured thereto so as to rotate knife roller 280 and anvil roller 277 in maintained relationship between knife blade 281 and anvil slot 278. When the knife blade roller 280 is rotated, the roller 277 will also be rotated whereby to dispose the knife blade 281 in the notch 278 and sever the web of the material to be rewound as passing therethrough.

The web thereafter continues through a plurality of guide rollers 295 carried on shafts 296, rollers 295 being driven by means of a plurality of gears 297 (Fig. 7) and idler gears 298, one of which cooperates with and is driven by the spur gear 95 carried on one end of the shaft 96.

*Wrapping material feeding and cutoff station*

With reference now primarily to Figs. 1, 4, 5 and 8, it is to be noted that a web of material from the wrapper parent roll 62 is guided into the wrapping station by means of mechanism, rollers, cutters and gears that are identical to the mechanism employed for performing a like function with respect to the core material from the parent roll 68. In this instance, the various mechanisms are supported from plate members 53, with the various pressure rollers, cutoff rollers and guide rollers being driven from one of the inner spider gears 86 by means of a spur gear 300, sprocket 301, chains 302 and sprocket 303.

As the wrapper material from the wrapper parent roll 62 is wrapped about the roll of rewrapped material from the parent roll 58, the ends of wrapper material which extend beyond the rewound material are crimped radially inwardly by action of a plurality of centrifugally operated crimping rollers 305 (Fig. 15). The crimping rollers 305 are clamped to appropriate shafts 151 outboard of the rollers 152 and in positions corresponding to the width of the roll. The crimping rollers 305 and one form thereof are shown in detail in Figs. 21 and 22. The rollers 305 comprise a central annular pin member 306 that hingedly supports split halves. The roller is disposed on the appropriate cage rollers 152 and is held in position by a pin 308 engaging the halves 307. Pin 306 holds a suitable biasing spring in place with this spring carrying the pin 308.

*Roll delivery mechanism*

With reference now to Figs. 1 and 3, means are provided for delivering completed wrapped rolls from the present winding machine. This means comprises a pair of longitudinal guide members 310 that are mounted on the leg transverse members 72. An endless conveyor 311 is disposed between the members 310 and is driven by means of a motor 312. Completed rolls of material disposed from the carrier cages in the unloading position are adapted to drop from the conveyor 311 and be delivered thereby to the side of the machine.

Operation

As stated hereinbefore, and by the means provided, the shaft 84 is continuously driven, thus continuously to drive the gears 86 and the various components of the cages connected thereto. Furthermore, the spider gears 87 and 88 are also continuously driven from the spur gears 127 and 128 that are connected into the gear train extending from the main shaft 80 thereto. As each of the cages approaches the various stations about the machine; namely, the core wrapping station, the rewinding material feeding station, the wrapper material feeding station and the discharge station, the cam 131 will open the switch 135 whereby to interrupt the flow of energy to the magnetic clutch 75 and disconnect the driving motor 73 from the pulley 76. At this time the machine is permitted to slow down with the rotating inertia of the components acting to maintain rotating motion of the apparatus at a reducing speed until such time as the switch 135 is again closed by action of the cam 131 and the magnetic clutch 75 is again reenergized to connect the motor 73 to the pulley 76 and drive the machine. The slowed down action serves to permit insertion of material into the machine. The slower speed may also be provided by utilizing a two-speed motor controlled by the switch 135 to eliminate dependence upon machine inertia.

The slow machine speed at the beforementioned stations is provided so as to hold under control the leading edge of each various web material at each station as the web leading edge enters the cage; also, to provide a greater latitude in possible misalignment and mis-synchronization of each material leading edge with the infeed rolls 158 and 160 of each cage.

With reference primarily to Figs. 9 and 13, the material from the core material parent roll 68 is fed through the rollers 132 and 135, is cut off by the knife 256 and fed between the rollers 248. Thereafter the web of core material is fed through the guides 254 and 255 and between the belts 176 and the pressure roller 160 at one of the carrier cages. It must be remembered at this time that the cages are also rotating in a counterclockwise direction as seen in Fig. 13, the arbor chuck 201 is being driven at a surface speed greater than the surface speed of the core material and belts 176 and roller 160 have a surface speed corresponding to the web material, or slightly greater. To facilitate this overrunning of the rollers 248, an overrunning clutch 315 is associated with the gear 253 of the gear train associated with the rollers 248 and 251. Such an overrunning clutch is also utilized with the feeding mechanism for the wrapper material and may be provided at other points in the machine, as desired, in accordance with usual design practices.

As the core material enters between the belts 176 and the pressure roller 160, it is fed within the confines of the rollers 152 of the cage and rolled into a core C as shown in Fig. 13. The arbor chuck 301 is the means by which the core and other material is wound. The purpose of the variable speed to shaft 84 is such that the surface speed of the arbor chuck 201 can be controlled for different types of material, desired tightness of roll, etc. As the diameter of the rewound roll increases, the arbor chuck will slip within the core and the variable speed drive to shaft 84 can also control the degree of slip as the rewound roll gets larger.

Following the manufacture of the core C, the cage containing the completed core moves in the continuing counterclockwise direction until it reaches the rewinding material feeding station, as shown in detail in Fig. 10. Product material from the parent roll 58 passes over the roller 261, under the roller 262 and about the measuring roller 263, the material being pulled from the parent roll 58 by action of the pressure roller 264 against the roller 263. The product material passes between guides 275 and 276 and between the relieved portions of cutoff rollers 277 and 280; thence between advance guide rollers 295. When cam 130 closes, switch 132, solenoid 134, is energized and single revolution clutch 285 causes cutoff rollers 277 and 278 to make a single revolution. As cutoff rollers makes a single revolution, knife blade 281 cooperates with slot 278 to cut off a predetermined length of web. Rollers 277 and 278 rotate at a surface speed equal to the linear speed of the product material web and as the web is cut, the resilient surface of roller 277 cooperates with the hard surface of roller 280 to act as a set of auxiliary drive rolls for the leading edges of the severed web, feeding same to advance guide rollers 295.

As the rewinding material is being wound about the core C, the cage containing this core is moving in a counterclockwise direction, as seen in Fig. 10, and as shown in Fig. 8, the material passes over the roller 157 on the arm 140 and over the companion roller 157 on the arm 141, with the winding action being completed at approximately the same time as the cage reaches the wrapping station. At this time, the material has been severed and a new leading edge thereof is fed into the next succeeding cage.

As the cage enters the wrapping station, the wrapping material is fed from the parent roll 62 and through the feed and cut off mechanism associated therewith to the cage containing the core and the rewinding material and about this material in the manner described hereinbefore. Following application of the wrapper about the rewound core and material thereon, arbor chucks 200 will be reciprocated axially by action of the cam 213 and associated mechanism and the end portions of the wrapping material will be tucked into the end of the core as described hereinafter. Inasmuch as the arbor chucks are rotated at all times, the wrapping material will be twisted neatly within the ends of the core. The centrifugal crimping rollers 305 serve to prevent the rewound and wrapped core from moving laterally within the cages until the cage reaches the discharge station, as shown in detail in Fig. 11. The hollow ends of the arbor heads 201 serve to pick up the conically deformed ends of the wrapper to dispose the wrapper in the core ends.

Upon reaching the discharge station, as stated hereinbefore, and as shown primarily in Figs. 14 and 16, the roller 193 will contact the cam 197 to rotate the shafts 142 and 143 of that particular cage whereby to open the cage, as shown in Figs. 8 and 11, and discharge the completed rewound and wrapped roll onto the conveyor 311 for disposition thereby to the side of the machine. It is to be noted that the lever arms 148 serve to push the completed roll from the cage and that the arbor chucks are completely withdrawn at this stage.

The speeds of the varius shafts and rollers throughout the machine are governed by the various gear trains and change gears, with the cutoff rollers associated with the core material feeding station and the cutoff rollers associated with the wrapping material feeding station being continuously driven at such a speed as to cut off a proper length of material following one revolution thereof. The change gears control the length of the parent material rewound web by controlling the number of revolutions of the measuring roll 263 in relationship to the arrival of the cage at each station. Speeds of the various shafts and rollers are controlled by suitable gearing from the main jackshaft 80, except that lineal speed of the arbor chuck and cage belts and rollers are controlled by the variable speed pulley drive through shaft 84.

Figure 25:
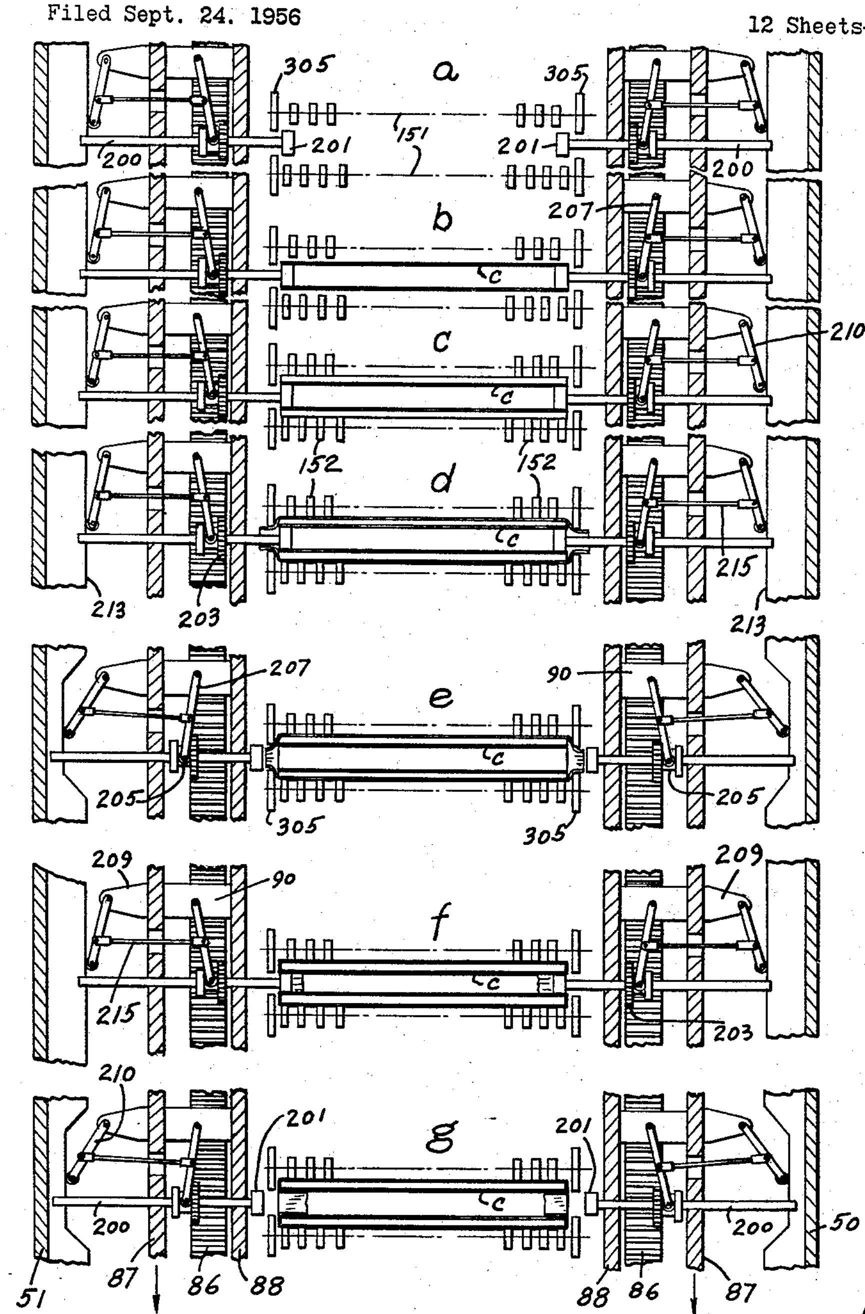
Fig. 25 is a composite diagrammatic figure having views *a* through *g*, inclusive, illustrating the various steps in the rotational operation of the present apparatus.
Figure 26:
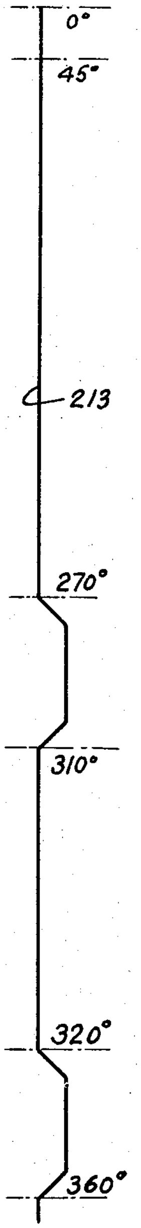
Fig. 26 is a line diagram illustrating degree relationships of the main actuating cam as about the circular operational path and is aligned and associated for clarity with Fig. 25.

With reference now primarily to Fig. 25, it is to be noted that the various stages in rotational operation of the device are set forth in diagrammatic form as compared with the diagrammatic illustration in Fig. 26 of the cams 213. Step *a* represents a empty cage; step *b*, the cage following disposition and forming of the core therein; step *c*, the cage arrangement for application of rewound material about the core; step *d*, the application of the wrapping material about the rewinding material; step *e*, the removal of the arbors from the ends of the roll; step *f*, the reinsertion of the arbors in the ends of the roll to tuck the ends of the wrapping material therein; and step *g*, the later retraction of the arbors to permit discharge of the completed roll. After discharge of the completed roll, the cage is again closed by movement of the roller 193 from the cam 197 and the empty cage is again ready to pick up a new sheet of core material to commence a new cycle thereof.

It may thus be seen that each time one of the cages passes the discharge station, a completed rewound and wrapped roll will be discharged therefrom. Simultaneously, a core will be made, the material will be rewound upon another core and a further rewound roll will be wrapped, to maintain high production by the use of the present simplified mechanism.

*Modified arbor operating mechanism*

Figure 27:
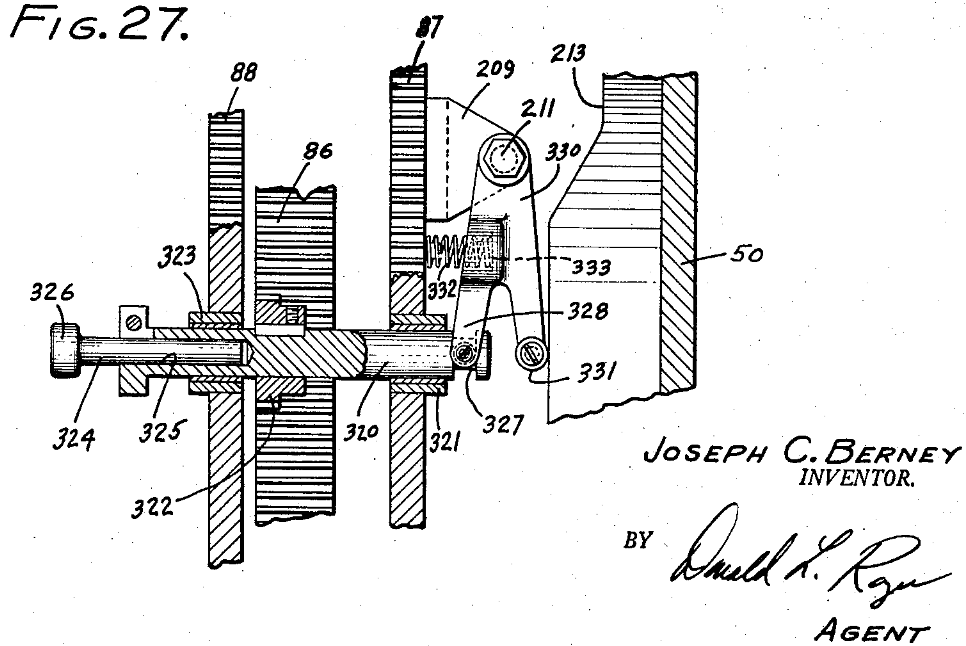
Fig. 27 is an enlarged fragmentary detailed sectional view similar to Fig. 17 showing a modified operating mechanism for the chuck arbors.

With reference now primarily to Fig. 27, it is to be noted that various changes may be made in the present mechanism, with Fig. 27 representing a modified form of arbor operating arrangement. As shown in this figure, the arbor shaft 320 is reciprocally positioned in a bearing 321 carried by the spider gear 87. The arbor shaft 320 carries a spur gear 322 that is keyed thereto, the shaft being further journalled in a bearing 323 in the spider gear 88. An arbor 324 is secured in a bore 325 in an end of the arbor shaft 320 and has a head 326 that is similar in design and purpose to the arbor head 201 described hereinbefore. The end of the arbor shaft 320 opposite from the bore 325 is provided with an annular groove 327 in which a trunnion 328 is positioned. The trunnion is formed as a portion of an inverted V-shaped arm 330 which carries a roller 331 and which is pivoted by means of the bolt 211 to the bracket 209 carried by the spider gear 87. The roller 331 is adapted for cooperation with the cam 213. Additionally, the roller 331 is biased in a direction toward the cam 213 by means of a compression spring 332 disposed between one surface of the spider gear 87 and a recess 333 formed in the arm 330. The operation and function of the modification shown in Fig. 27 is substantially identical to that of the similar form of the invention shown in Fig. 17.

*Modified wrapper ends tucking mechanism*

Figures 28, 29:
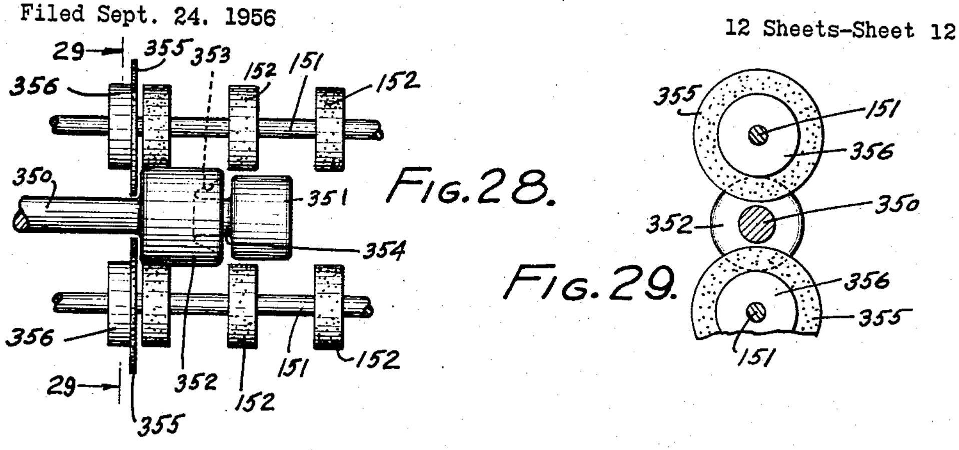
Fig. 28 is an enlarged fragmentary detailed view illustrating a modified form of chuck arbor and wrapper roll end tucking arrangement.
Fig. 29 is a detailed sectional view showing resilient tucking members, as taken substantially as indicated by line 29—29, Fig. 28.

In Figs. 28 through 33, a modified form of arbor is illustrated to provide for proper deformation of the wrapper material ends, constant support of the ends of the rolls, coaxial alignment within the cages and for discharge from the cages. With reference to Fig. 28, an arbor shaft 350 has a pair of coextensive and coaxially arranged heads 351 and 352 integrally formed thereon. The head 351 is of a slightly smaller diameter than the head 352, with the head 352 having a conical recess 353 in the end thereof adjacent the head 351. A stem 354 is formed between the base of the recess 353 and the adjacent side of the head 351. Additionally, alternate shafts 151 have resilient annular members 355 that are relatively thin, positioned thereabout and retained in position by means of retaining members 356. The resilient members 355 are of a larger diameter than the retaining members 356 and when the cage is in a closed position and empty, as shown in Fig. 29, extend to a point adjacent the arbor 350.

Figure 30:
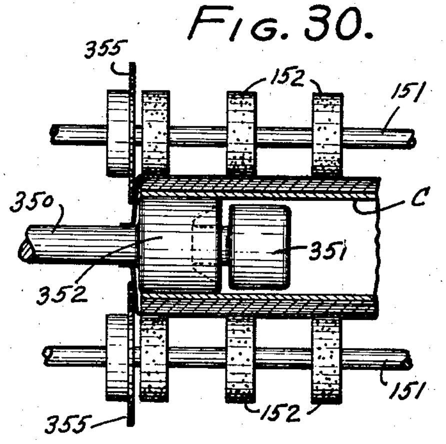
Figs. 30 through 33, inclusive, are similar to Fig. 28 and illustrate various steps in the tucking of the wrapper ends in the rewound rolls and support therefor during the tucking operation.
Figure 31:
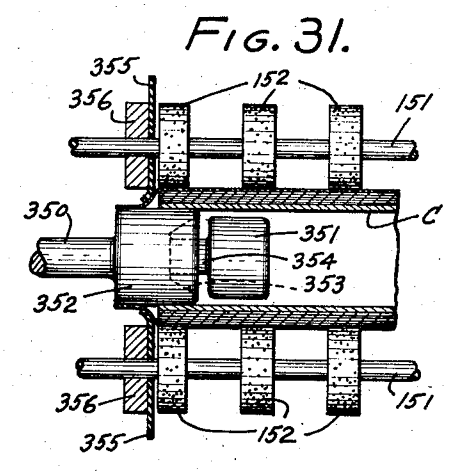
Figure 32:
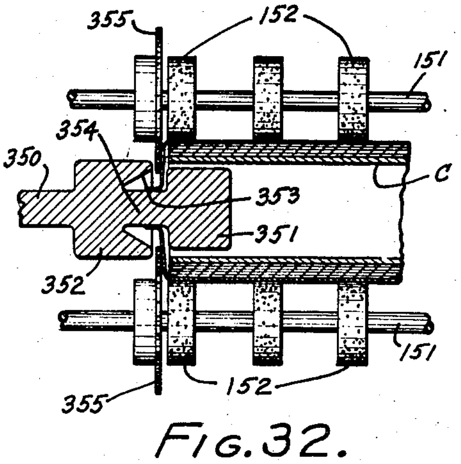
Figure 33:
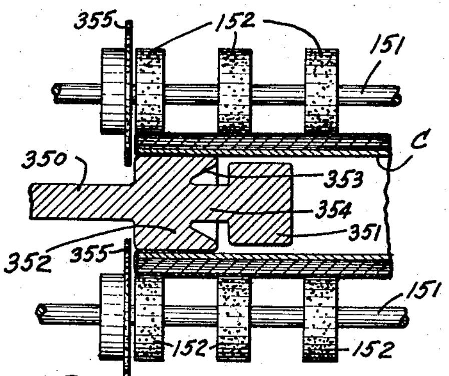

As shown in Fig. 30, the following application of the wrapper to the rewound roll, the resilient members 355 serve to deform the wrapper over ends of the roll. As shown in Fig. 31, as the arbor is withdrawn, in the manner described hereinbefore and in accordance with the particular shape of the cam 213, the inwardly crimped wrapper will slide along the outer surface of the head 352 and, as shown in Fig. 32, will be forced into the space defined between the heads 351 and 352 and against the stem 354. The conical recess 353 will then pick up the inwardly disposed ends of the wrapper and will tuck the wrapper within the roll as shown in Fig. 33. During the tucking action of the wrapper ends, the roll is continuously supported on the arbor and when in the position shown in Fig. 32, guided means of the head 351. Following the tucking operation shown in Fig. 33, the head 351 is withdrawn from the ends of the roll to permit discharge of the roll from the apparatus. Obviously, the particular shape of the cam 213 will be altered when using this form of arbor arrangement, in order that greater lateral movement of the arbor may be experienced for discharge thereof than for the tucking operation of the wrapper.

*Further modified structures*

In view of the foregoing, it may be recognized that numerous further modifying structures may be employed herewith as may suggest themselves from the teachings hereof and which may be necessary in order mechanically to carry forward the basic principles disclosed. One of the major modifications that may be employed involves a means for driving one or more of the rollers 152 forming a portion of the cage mechanisms. It is evident that while the material being rewound within the cage is effective to rotate the rollers 152, a positive drive of the beforementioned one or more of these rollers may in some instances be desirable. Such an arrangement may include a suitable drive from the driven shaft 142 with power transfer means to the shaft 143 and to either one or more of the shafts 147 or the like, with chain or belt connections between motion transmitting means on the shafts 147 and the one or more of the shafts 151 on which the rollers 152 are mounted.

Accordingly, the one or more of the rollers 152 would thereby be driven to effect a driven rotating action upon the material contained within the cage. Obviously, a mechanism of this type is within the skill of the designer in this field.

While the foregoing describes but one of several mechanical modifications that may be incorporated in the present apparatus, it is evident that many more such modifications may be included to carry forth specific requirements while still retaining the broad basic principles involved in the construction and functions hereof.

Having thus described the invention and the present embodiments and modifications thereof, it is further desired to emphasize the fact that many other modifications may be included herein and resorted to in a manner limited only by a just interpretation of the following claims.

I claim:

1. In a roll material winding apparatus: a frame structure; a cage support rotatably carried by said frame structure; a plurality of cages carried by said support; means for continuously rotating said support; a plurality of material feeding stations carried by said frame structure and spaced circumferentially about said support; means for delivering a predetermined quantity of material from each of said stations to said cages in timed sequence with individual disposition of each of said cages at said stations; means for rotatably driving rolls of said material in said cages; means for axially guiding said rolls of material in said cages; means for disengaging said guiding means from said rolls; a roll discharge station carried by said frame structure and positioned adjacent said support; and means for opening said cages upon individual disposition thereof at said discharge station, for ejecting completed rolls from the apparatus.

2. In a roll material winding apparatus: a frame structure; a cage support rotatably carried by said frame structure; a plurality of cages carried by said support; means for continuously rotating said support; a plurality of material feeding stations carried by said frame structure and spaced circumferentially about said support; means for delivering material from a supply to each of said stations and to said cakes in timed sequence with individual disposition of each of said cages at said stations; means for severing a predetermined length of said material from said supply; means for rotatably driving rolls of said material in said cages; means for axially guiding said rolls of material in said cages; means for disengaging said guiding means from said rolls; a roll discharge station carried by said frame structure and positioned adjacent said support; and means for opening said cages upon individual disposition thereof at said discharge station for ejecting completed rolls from the apparatus.

3. In a roll material winding apparatus: a frame structure; a cage support rotatably carried by said frame structure; a plurality of cages carried by said support; means for continuously rotating said support; a plurality of material feeding stations carried by said frame structure and spaced circumferentially about said support; means for delivering material from a supply to each of said stations and to said cages in timed sequence with individual disposition of each of said cages at said stations; means for severing a predetermined length of said material from said supply; means for rotatably driving rolls of said material in said cages; means for axially guiding said rolls of material in said cages; means for disengaging said guiding means from said rolls; a roll discharge station carried by said frame structure and positioned adjacent said support; means for opening said cages upon individual disposition thereof at said discharge station for ejecting completed rolls from the apparatus; and means for slowing said continuous rotation of said support as said cages arrive at said stations.

4. In a roll material winding apparatus: a frame structure; a cage support rotatably carried by said frame structure; a plurality of cages carried by said support; means for continuously rotating said support; a plurality of material feeding stations carried by said frame structure and spaced substantially equally circumferentially about said support; means for delivering material from a supply to each of said stations and to said cages in timed sequence with individual disposition of each of said cages at said stations; means for severing a predetermined length of said material from said supply; means for rotatably driving rolls of said material in said cages; means for axially guiding said rolls of material in said cages; cam means carried by said frame structure and engageable with said arbor means for disengaging said arbor means from said rolls; a roll discharge station carried by said frame structure and positioned adjacent said support; means for opening said cages upon individual disposition thereof at said discharge station for ejecting completed rolls from the apparatus; and means for slowing said continuous rotation of said support as said cages arrive at said stations.

5. A roll material winding apparatus comprising: a frame structure; a cage support rotatably carried by said frame structure; a plurality of cages carried by a peripheral portion of said support, said cages including a plurality of shafts having spaced rollers thereon; means for continuously rotating said support; a plurality of material feeding stations carried by said frame structure and spaced equally circumferentially about said support, means for delivering material from a plurality of supply rolls to each of said stations and to said cages in timed sequence with individual disposition of each of said cages at said stations, each of said stations accommodating different types of materials; means for severing predetermined lengths of said materials from said supplies; means for rotatably driving rolls of said materials in said cages; rotatable arbor means for axially guiding said rolls of material in said cages; cam means carried by said frame structure and engageable with said rotatable arbor; means for disengaging said rotatable arbor means from said rolls; a roll discharge station carried by said frame structure and positioned adjacent said support; means for opening said cages upon individual disposition thereof at said discharge station for ejecting completed rolls from the apparatus; and electrically operated means for reducing speed of rotation of said support as said cages arrive at said stations.

6. A roll material winding apparatus comprising; in combination: a frame structure; a horizontally disposed cage support rotatably carried by said frame structure; a plurality of cages carried by a peripheral portion of said support, said cages including a plurality of shafts having spaced rollers thereon; means for continuously rotating said support about an axis thereof; a plurality of material feeding stations carried by said frame structure and spaced equally circumferentially about said support; means for delivering material from a plurality of supply rolls to each of said stations and to said cages in timed sequence with individual disposition of each of said cages at said stations, each of said stations accommodating different types of roll material; driven cutter means for severing predetermined lengths of said materials from said supplies, means for rotatably driving rolls of said material in said cages; rotatable arbor means for axially guiding said rolls of material in said cages; cam means carried by said frame structure and engageable with said rotatable arbors; means for disengaging said rotatable arbor means from said rolls; a roll discharge station carried by said frame structure and positioned adjacent said support; means responsive to engagement of a portion of said cages with a fixed member carried by said frame structure for opening said cages upon individual disposition thereof at said discharge station for ejecting completed rolls from the apparatus; and electrically operated means for reducing speed of rotation of said support as said cages arrive at said stations.

7. In an apparatus for rewinding material into rewound rolls, the combination of: a supporting frame structure; a main shaft rotatably carried by said frame structure; driving means for continuously rotating said shaft; laterally spaced radially extending members supported on said shaft; means to rotate said members independent of said shaft; a pluarity of carrier cages carried by said members and circumferentially spaced laterally therebetween; means for normally biasing each of said cages toward a closed position; means to open said cages; arbor chucks positioned axially in lateral ends of each of said cages and carried by said members; a plurality of material feeding stations and a discharge station carried by said frame structure and spaced about the periphery of said members and said cages; means for individually delivering material from a plurality of supplies thereof to each of said stations; means forming a portion of said delivering means for severing predetermined material lengths from said supplies of material; means for rotating said material lengths in said cages and about said arbor chucks thereof, one of said lengths of material being an overwrapping having a width greater than widths of other material about said arbor chucks; means for axially withdrawing said arbor chucks from rewound and wrapped rolls and for re-inserting said chucks therein to tuck ends of said overwrapping into ends of said rolls; means for again withdrawing said arbor chucks from said rolls, adjacent said discharge station, and upon opening of one of said cages therein; and means for receiving completed rolls discharged from said one of said cages.

8. An apparatus for rewinding material into rewound rolls comprising: a supporting frame structure; a main shaft rotatably carried by said frame structure; driving means for continuously rotating said shaft; laterally spaced radially extending members supported on said shaft; means to rotate said members independent of said shaft; a plurality of carrier cages carried by said members and circumferentially spaced laterally therebetween; means for normally biasing each of said cages toward a closed position; means for opening said cages; arbor chucks positioned axially in lateral ends of each of said cages and carried by said members; means for rotatably driving said arbor chucks; a plurality of material feeding stations and a discharge station carried by said frame structure and spaced about the periphery of said members and said cages; means for individually delivering material from a plurality of supplies thereof to each of said stations; means forming a portion of said delivering means for severing predetermined material lengths from said supplies of material; means for rotating said material lengths in said cages and about said arbor chucks thereof, one of said lengths of material being an overwrapping having a width greater than widths of other material about said arbor chucks; means for axially withdrawing said arbor chucks from rewound and wrapped rolls and for reinserting said chucks therein to tuck ends of said overwrapping into ends of said rolls; means for again withdrawing said arbor chucks from said rolls, adjacent said discharge station and upon opening of one of said cages therein; and means for receiving completed rolls discharged from said one of said cages.

9. An apparatus for rewinding material into rewound rolls comprising, in combination: a supporting frame structure; a main shaft rotatably carried by said frame structure; driving means for continuously rotating said shaft; laterally spaced radially extending members supported on said shaft; means to rotate said members independent of said shaft; a plurality of carrier cages carried by said members and circumferentially spaced laterally therebetween; means for normally biasing each of said cages toward a closed position; means to open said cages; arbor chucks positioned axially in lateral ends of each of said cages and carried by said members; means coupled with said main shaft for driving said arbor chucks; a plurality of material feeding stations and a discharge station carried by inner lateral surfaces of said frame structure and spaced about the periphery of said members and said cages; means for individually delivering material from a plurality of supplies thereof to each of said stations; means forming a portion of said delivering means for severing predetermined material lengths from said supplies of material, said severing means adjacent at least one of said feeding stations being intermittently operated; means driven by said coupled driving means for rotating said material lengths in said cages and about said arbor chucks thereof, one of said lengths of material being an overwrapping having a width greater than widths of other material about said arbor chucks; means for axially reciprocally positioning said arbor chucks relative to said rewound and wrapped rolls to tuck ends of said overwrapping into ends of said rolls; means for withdrawing said arbor chucks from said rolls, adjacent said discharge station and upon opening of one of said cages therein; and conveyor means for receiving completed rolls discharged from said one of said cages.

10. An apparatus for rewinding material into rewound rolls comprising, in combination: a supporting frame structure; a main shaft rotatably journalled in said frame structure; driving means for continuously rotating said shaft; laterally spaced radially extending members supported on said shaft; means to rotate said members independent of said shaft; a plurality of carrier cages carried by said members and circumferentially spaced laterally therebetween; means for normally biasing said cages toward a closed position; means to open said cages; arbor chucks positioned axially in lateral ends of each of said cages and carried by said members; means coupled with said main shaft for rotatably driving said arbor chucks; a plurality of material feeding stations and a discharge station disposed between, carried by lateral portions of said frame structure and spaced about the periphery of said members and said cages; means for individually delivering material from a plurality of supplies thereof to each of said stations; means forming a portion of said delivering means for severing predetermined material lengths from said supplies of material; electrically operable means for intermittently operating said severing means at one of said feeding stations; means driven by said coupled driving means for rotating said material lengths in said cages and about said arbor chucks thereof, one of said lengths of material being an overwrapping having a width greater than widths of other material about said arbor chucks; means for axially reciprocally moving said arbor chucks relative to said rewound and wrapped rolls to tuck and twist end of said overwrapping into ends of said rolls; means for again withdrawing said arbor chucks from said rolls, adjacent said discharge station and upon opening of one of said cages therein; driven conveyor means for receiving completed rolls discharged from said one of said cages; and means for reducing the driven speed of said main shaft as said carrier cages reach said feeding and discharge stations.

11. An apparatus for rewinding material from a plurality of sources into rewound rolls thereof comprising, in combination: a supporting frame structure having laterally spaced frame plate members; a main shaft rotatably journalled in said plate members; driving means for continuously rotating said shaft; laterally spaced radially extending spider gear members supported on said shaft; means to rotate said gear members independent of said shaft; a plurality of carrier cages carried by said gear members and circumferentially spaced laterally therebetween; means for normally biasing elements of said cages toward a closed position; means to open said cages; arbor chucks positioned axially in outer lateral ends of each of said cages and carried by said gear members; means coupled with said main shaft for rotatably driving said arbor chucks; a plurality of material feeding stations and a discharge station disposed between, carried by lateral surfaces of said plate members and spaced about the periphery of said gear members and said cages; means for individually delivering material from a plurality of supplies thereof to each of said stations; means including an elongated knife blade and forming a portion of said delivering means for severing predetermined material lengths from said supplies of material; electrically operable means for intermittently operating said severing means at one of said feeding stations; means driven by said coupled driving means for rotating said material lengths in said cages and about said arbor chucks thereof, one of said lengths of material being an overwrapping having a width greater than widths of other material about said arbor chucks; means for axially withdrawing said arbor chucks from rewound and wrapped rolls and for reinserting said chucks therein to tuck and twist end of said overwrapping into ends of said rolls; means for again withdrawing said arbor chucks from said rolls adjacent said discharge station and upon opening of one of said cages therein; driven conveyor means carried by said frame structure for receiving completed rolls discharged from said one of said cages; and clutch means operable on said shaft driving means for reducing the driven speed of said main shaft as said carrier cages reach said feeding and discharge stations.

12. A material tucking mechanism for a rewinding apparatus comprising, in combination: support means for a rewound roll of material; a wrapper disposed about said roll of material and having end portions disposed beyond ends of said roll of material; arbor means for guiding ends of said roll; means for partially withdrawing said arbor means from ends of said roll whereby to retain axial guiding of said roll; means for radially inwardly crimping said end portions of said wrapper following said partial withdrawal of said arbor means; and means for thereafter reinserting said arbor means into said ends of said roll whereby to tuck said end of said wrapper therein.

13. A material tucking mechanism for a rewinding apparatus comprising, in combination: roller cage support means for a rewound roll of material; a wrapper disposed about said roll of material and having end portions disposed beyond the ends of said roll of material; arbor means for guiding ends of said roll; cam controlled means for partially withdrawing said arbor means from ends of said roll whereby to retain axial guiding of said roll;

means for radially crimping said end portions of said wrapper following said partial withdrawal of said arbor means; and cam controlled means for thereafter reinserting said arbor means into said ends of said roll whereby to tuck said end of said wrapper therein.

14. A combination arbor and wrapper tucking apparatus for a material rewinding machine comprising, in combination therewith: a pair of spaced, axially movable shaft members; first enlargements formed on facing ends of said members and adapted to serve as supports for rolls of rewound material having a wrapper disposed thereabout with end portions extending beyond ends of said rewound rolls; second enlargements positioned adjacent said first enlargements and axially outwardly therefrom; conical depressions in ends of said second enlargements; caging structures for guiding outer surfaces of said roll and said wrapper; and flexible discs carried by said cages adjacent ends of said rolls, said shafts being adapted for axial outward movement whereby to cause radial inward deformation of said wrapper ends by said flexible discs and into spaces defined between said first and second enlargements, axial inward movement of said shafts engaging said deformed ends by said conical depressions to tuck said ends into said roll.

15. A combination arbor and wrapper tucking apparatus for a material rewinding machine comprising, in combination therewith: a pair of spaced, axially movable shaft members; first enlargements formed on facing ends of said members and adapted to serve as supports for rolls of rewound material having a wrapper disposed thereabout with end portions extending beyond ends of said rewound rolls; second enlargements having diameters greater than said first enlargements and positioned adjacent said first enlargements and axially outwardly therefrom; conical depressions in ends of said second enlargements; caging structures for guiding outer surfaces of said roll and said wrapper; and flexible discs carried by said cages adjacent ends of said rolls, said shafts being adapted for axial outward movement whereby to cause radial inward deformation of said wrapper ends by said flexible discs and into spaces defined between said first and second enlargements, axial inward movement of said shafts engaging said deformed ends by said conical depressions to tuck said ends into said roll.

16. A combination arbor and wrapper tucking apparatus for a material rewinding machine comprising, in combination therewith: a pair of spaced, axially movable shaft members; first enlargements formed on facing ends of said members and adapted to serve as supports for rolls of rewound material having a wrapper disposed thereabout with end portions extending beyond ends of said rewound rolls; second enlargements having diameters greater than said first enlargements and positioned adjacent said first enlargements and axially outwardly therefrom; conical depressions in ends of said second enlargements; cam operable means for axially positioning and moving said shafts; caging structures for guiding outer surfaces of said roll and said wrapper; and flexible discs carried by said cages adjacent ends of said rolls, said shafts being adapted for axial outward movement to positions disposing only said first enlargements in ends of said roll, whereby to cause radial and inward deformation of said wrapper ends by said flexible discs and spaces defined between said first and second enlargements, axial inward movement of said shafts engaging said deformed ends by said conical depressions to tuck said ends into said roll.

17. In a material rewinding apparatus of the class described and having caging mechanism for rewound rolls of material, a guiding mechanism for material being fed to said cages for rewinding therein comprising, in combination: a plurality of rollers forming a portion of said cages; support means for said rollers; arm means carried by said support means, free ends of said arm means and a pivot point thereof having shafts disposed therebetween; a plurality of pulleys fixed to said shafts; endless belts disposed on said pulleys; and material guide member carried by said arm means and disposed between said pulleys for confining, aligning and guiding material fed thereto.

18. In a material rewinding apparatus of the class described and having caging mechanism for rewound rolls of material, a guiding mechanism for material being fed to said cages for rewinding therein comprising, in combination: a plurality of rollers forming a portion of said cages; support means for said rollers; arm means carried by said support means, free ends of said arm means and a pivot point thereof having shafts disposed therebetween; a plurality of pulleys fixed to said shafts; endless belts disposed on said pulleys; spring means for biasing said free ends of said arm means and said shaft and rollers carried thereby toward a central area of said cages; and material guide members carried by said arm means and disposed between said pulleys for confining, aligning and guiding material fed thereto.

References Cited in the file of this patent

UNITED STATES PATENTS

| | | |
|---|---|---|
| 732,656 | Schneider | June 30, 1903 |
| 1,987,482 | Mandell | Jan. 8, 1935 |
| 2,261,344 | Delegard | Nov. 4, 1941 |
| 2,274,745 | Schultz | Mar. 3, 1942 |
| 2,301,016 | Cannard | Nov. 3, 1942 |